US007539760B1

(12) United States Patent  
Petry et al.

(10) Patent No.: US 7,539,760 B1
(45) Date of Patent: May 26, 2009

(54) SYSTEM AND METHOD FOR FACILITATING FAILOVER OF STATEFUL CONNECTIONS

(75) Inventors: Brian D. Petry, San Diego, CA (US); Fazil Ismet Osman, Escondido, CA (US)

(73) Assignee: Astute Networks, Inc., San Diego, CA (US)

( * ) Notice: Subject to any disclaimer, the term of this patent is extended or adjusted under 35 U.S.C. 154(b) by 680 days.

(21) Appl. No.: 10/661,096

(22) Filed: Sep. 12, 2003

(51) Int. Cl.
*G06F 15/16* (2006.01)

(52) U.S. Cl. .................. 709/227; 709/220; 709/222; 709/224; 709/228; 709/236; 709/237; 709/248

(58) Field of Classification Search ............... 709/220, 709/222, 224, 227–228, 236, 237, 248
See application file for complete search history.

(56) References Cited

U.S. PATENT DOCUMENTS

| | | | |
|---|---|---|---|
| 5,640,394 | A | 6/1997 | Schrier et al. |
| 6,070,199 | A | 5/2000 | Axtman et al. |
| 6,133,846 | A | 10/2000 | Birkedahl et al. |
| 6,172,980 | B1 | 1/2001 | Flanders et al. |
| 6,226,680 | B1 | 5/2001 | Boucher et al. |
| 6,247,060 | B1 | 6/2001 | Boucher et al. |
| 6,252,851 | B1 | 6/2001 | Siu et al. |
| 6,334,153 | B2 | 12/2001 | Boucher et al. |
| 6,338,078 | B1 | 1/2002 | Chang et al. |
| 6,393,458 | B1 | 5/2002 | Gigliotti et al. |
| 6,460,080 | B1 | 10/2002 | Shah et al. |
| 6,532,079 | B1 * | 3/2003 | Serex et al. ............ 358/1.15 |
| 6,546,428 | B2 | 4/2003 | Baber et al. |
| 6,587,884 | B1 | 7/2003 | Papadopoulos et al. |
| 6,629,697 | B1 | 10/2003 | Asai et al. |

(Continued)

FOREIGN PATENT DOCUMENTS

| | | |
|---|---|---|
| WO | WO 00/41365 A1 | 7/2000 |
| WO | WO0101272 A2 | 1/2001 |

OTHER PUBLICATIONS

Camarillo et al., "Mapping of Media Streams to Resource Reservation Flows," In: Network Working Group, Request for Comments No. 3524, Category: Standards Track, Apr. 2003, p. 1-6.

*Primary Examiner*—Liangche A Wang
(74) *Attorney, Agent, or Firm*—Cooley Godward Kronish LLP

(57) ABSTRACT

A method and apparatus for facilitating failover of a stateful protocol connection is disclosed herein. The disclosed method includes receiving data sent by a first external entity in accordance with the stateful protocol connection. Acknowledgment of receipt of the data is withheld until a predefined operation involving the data has been performed. The method further includes transferring state information relating to the stateful protocol connection to a standby system. Once the predefined operation involving the data has been performed, the acknowledgment of receipt of the data is sent to the first external entity. This enables the stateful protocol connection to be failed over to the standby system with minimal or any data loss. In a particular implementation the predefined operation comprises committing the data to an application and receiving a send acknowledgment command from the application. In other implementations the predefined operation may comprise sending the data to a host entity and receiving confirmation that it has been received at the host.

32 Claims, 10 Drawing Sheets

U.S. PATENT DOCUMENTS

| | | |
|---|---|---|
| 6,665,725 B1 | 12/2003 | Dietz et al. |
| 6,735,717 B1 * | 5/2004 | Rostowfske et al. .......... 714/13 |
| 6,775,706 B1 | 8/2004 | Fukumoto et al. |
| 6,829,697 B1 | 12/2004 | Davis et al. |
| 6,909,713 B2 | 6/2005 | Magnussen et al. |
| 7,076,555 B1 * | 7/2006 | Orman et al. ................ 709/227 |
| 7,137,040 B2 * | 11/2006 | Bae et al. ..................... 714/47 |
| 7,143,131 B1 * | 11/2006 | Soles et al. .................. 709/203 |
| 2002/0016843 A1 | 2/2002 | Schweitzer et al. |
| 2002/0174218 A1 | 11/2002 | Dick et al. |
| 2003/0014662 A1 | 1/2003 | Gupta et al. |
| 2003/0037154 A1 | 2/2003 | Poggio et al. |
| 2003/0079033 A1 | 4/2003 | Craft et al. |
| 2003/0177252 A1 | 9/2003 | Krichevski et al. |
| 2004/0004948 A1 * | 1/2004 | Fletcher et al. ............. 370/338 |
| 2004/0010583 A1 * | 1/2004 | Yu et al. ..................... 709/224 |
| 2004/0024873 A1 | 2/2004 | DiMambro |
| 2004/0210795 A1 * | 10/2004 | Anderson ...................... 714/6 |

* cited by examiner

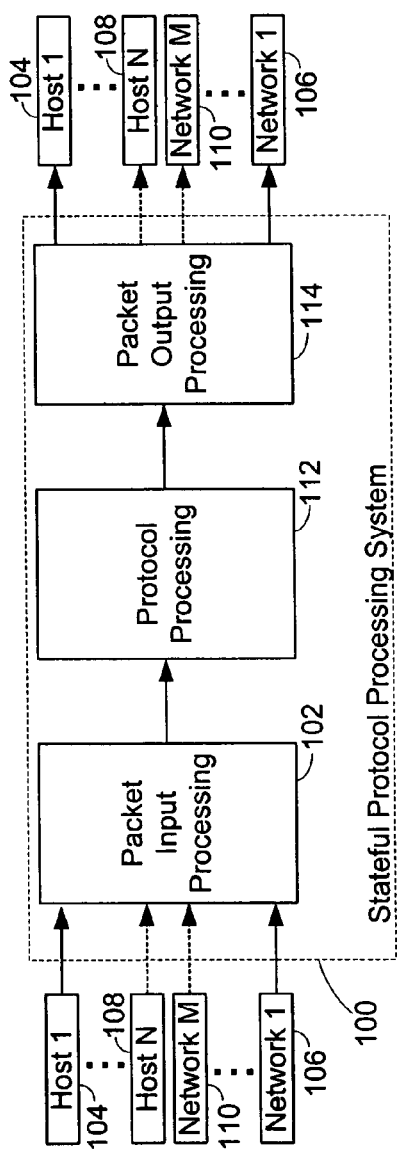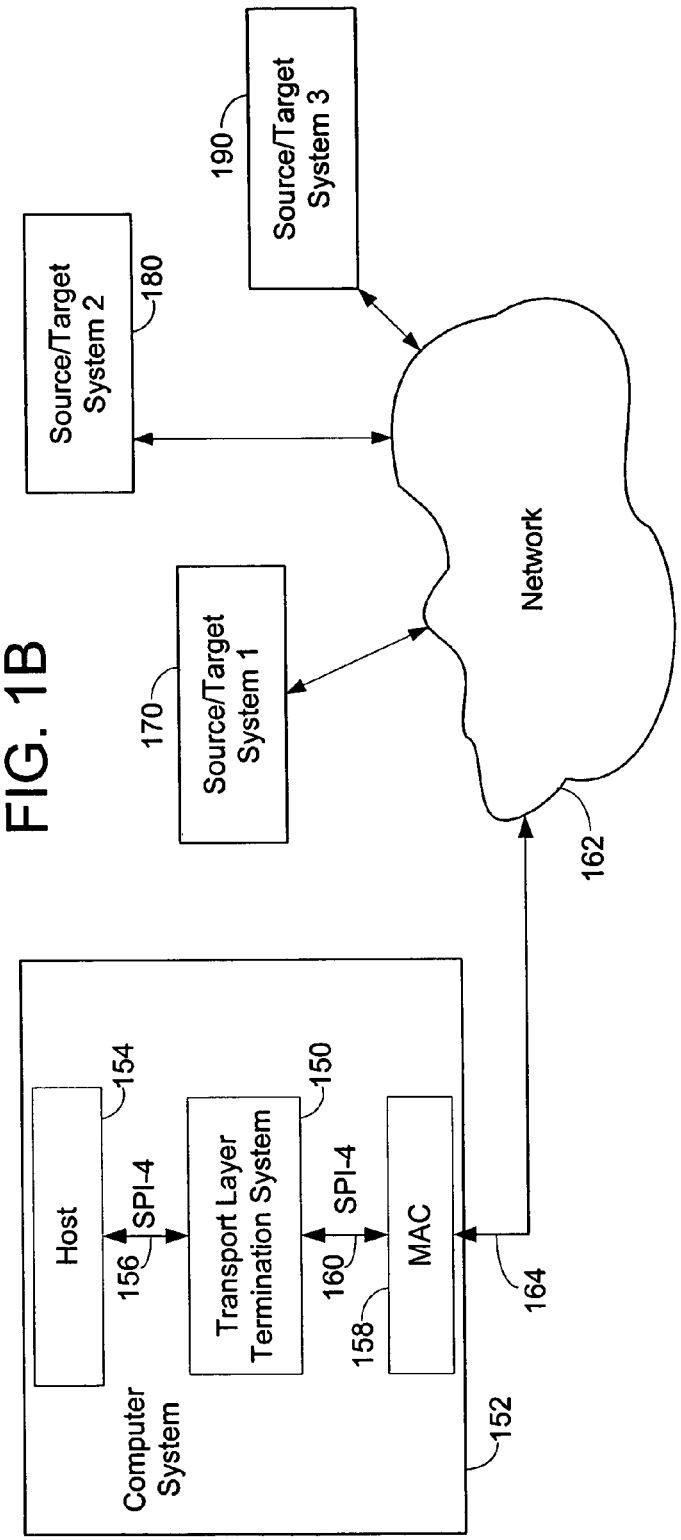

SYSTEM AND METHOD FOR FACILITATING FAILOVER OF STATEFUL CONNECTIONS

BACKGROUND OF THE INVENTION

1. Field of the Invention

This invention relates to data transfer processing systems. More particularly, the present invention relates to a system and method for facilitating failover of stateful connections.

2. Background and Benefits of the Invention

Data transfer systems typically convey data through a variety of layers, each performing different types of processing. The number of different layers, and their attributes, vary according to the conceptual model followed by a given communication system. Examples include a model having seven layers that is defined by the International Standards Organization (ISO) for Open Systems Interconnection (OSI), and a five-layer model defined by the American National Standards Institute (ANSI) that may be referred to as the "Fibre Channel" model. Many other models have been proposed that have varying numbers of layers, which perform somewhat different functions. In most data communication systems, layers range from a physical layer, via which signals containing data are transmitted and received, to an application layer, via which high-level programs and processes share information. In most of the conceptual layer models, a Transport Layer exists between these extremes. Within such transport layers, functions are performed that are needed to coordinate the transfer of data, which may have been sent over diverse physical links, for distribution to higher-level processes.

Within the transport layer, a communication system coordinates numerous messages (such as packets) that each belong to a particular "flow" or grouping of such messages. Each message may be identified by its association with a particular flow identification key (flow key), which in turn is typically defined by information about the endpoints of the communication. Transport layer processing is generally performed by processing modules which will be referred to as transport layer terminations (TLTs), which manage data received from remote TLTs (or being transmitted to the remote TLTs) according to a set of rules defined by the transport layer protocol (TLP) selected for each particular flow. A TLT examines each message that it processes for information relevant to a flowstate that defines the status of the flow to which the message belongs, updates the flowstate accordingly, and reconstitutes raw received data on the basis of the flowstate into proper form for the message destination, which is typically either a remote TLT or a local host. Flows are typically bidirectional communications, so a TLT receiving messages belonging to a particular flow from a remote TLT will generally also send messages belonging to the same flow to the remote TLT. Management of entire flows according to selected TLPs by maintaining corresponding flowstates distinguishes transport layer processing from link level processing, which is generally concerned only with individual messages.

There are many well-known TLPs, such as Fibre Channel, SCTP, UDP and TCP, and more will likely be developed in the future. TLPs typically function to ensure comprehensible and accurate communication of information to a target, such as by detecting and requesting retransmission of lost or damaged messages, reorganizing various messages of a flow into an intended order, and/or providing pertinent facts about the communication to the target. Transmission Control Protocol (TCP) is probably the best-known example of a TLP, and is extensively used in networks such as the Internet and Ethernet applications. TCP is a connection-oriented protocol, and information about the state of the connection must be maintained at the connection endpoints (terminations) while the connection is active. The connection state information includes, for example, congestion control information, timers to determine whether packets should be resent, acknowledgement information, and connection identification information including source and destination identification and open/closed status. Each active TCP connection thus has a unique connection ID and a connection state. A TCP "connection" is an example of the more general TLP concept that is termed "flow" herein, while TCP "connection ID" and "connection state" are examples of the more general TLP concepts referred to herein as "flow key" and "flowstate," respectively. The flow key may be uniquely specified by a combination of the remote link (destination) address (typically an Internet Protocol or "IP" address), the remote (destination) TCP port number, the local link (source) address (also typically an IP address), the local (source) TCP port number, and in some cases a receiver interface ID. It may also be useful to include a protocol indication as part of the general flow key, in order to distinguish flows that have otherwise identical addressing but use different TLPs.

In TCP-based systems designed for high reliability, it is known to employ standby elements to which TCP connections may be transferred or "failed-over" in the event of failure of the connection. When a standby element becomes active, it does not possess all of the state information concerning the connections which were being supported by the failed TCP-based element. As a consequence, packets corresponding to such connections cannot be handled by the standby element. This results in such packets being discarded or in error messages being sent to the entities from which the packets were sent. The connections are then taken down and new connections established using the standby element. Unfortunately, this tearing down of the prior connections and the subsequent of establishment of new connections using the standby element results in packet transmission delays and requires considerable processing overhead. Accordingly, it would be useful to provide a technique capable of facilitating efficient failover of stateful protocol connections with minimal or no packet loss.

SUMMARY OF THE INVENTION

In summary, the present invention relates to a method of facilitating failover of a stateful protocol connection. The method includes receiving data sent by a first external entity in accordance with the stateful protocol connection. Consistent with the invention, acknowledgment of receipt of the data is withheld until a predefined operation involving the data has been performed. The method further includes transferring state information relating to the stateful protocol connection to a standby system. Once the predefined operation involving the data has been performed, the acknowledgment of receipt of the data is sent to the first external entity. This enables the stateful protocol connection to be failed over to the standby system with minimal or any data loss. In a particular embodiment the predefined operation comprises committing the data to an application and receiving a send acknowledgment command from the application. In other embodiments the predefined operation may comprise, for example, sending the data to a host entity and receiving confirmation that it has been received at such host.

In another aspect, the present invention relates to a stateful protocol processing apparatus including a proxy element having a first protocol core and a second protocol core. The first protocol core supports a first stateful protocol connection over which data is received from a first external entity. Consistent with the invention, the proxy element is configured to withhold acknowledgment of receipt of the data until performance of a predefined operation involving the data. The apparatus further includes a standby element to which state information relating to the first stateful protocol connection is transferred from the proxy element. In a particular embodiment the predefined operation comprises committing the data to an application executing upon the proxy element and receiving a send acknowledgment command from the application. The apparatus may further include a switch disposed to failover the first stateful protocol connection from the proxy element to the standby proxy.

The present invention is also directed to a method of facilitating failover of a stateful protocol connection from a proxy element to a standby proxy. The method includes receiving, at the proxy element, data sent by a first external entity in accordance with a first stateful protocol connection. Consistent with the invention, acknowledgment of receipt of the data at the proxy element is withheld until a predefined operation involving the data has been performed. The method further includes transferring state information relating to the first stateful protocol connection from the proxy element to a standby proxy. The acknowledgment of receipt is sent to the first external entity subsequent to performance of the predefined operation involving the data. In certain embodiments the predefined operation comprises committing the data to an application executing upon the proxy element and receiving a send acknowledgment command from the application. In other embodiments the predefined operation may comprise sending, from the proxy element, the data to a second external entity and receiving, at the proxy element, a second acknowledgment that the data has been received at the second external entity. The method may further include failing over the first stateful protocol connection and the second stateful protocol connection to the standby proxy.

BRIEF DESCRIPTION OF THE DRAWINGS

For a better understanding of the nature of the features of the invention, reference should be made to the following detailed description taken in conjunction with the accompanying drawings, in which:

FIG. 1A is a block diagram showing general interface connections to a stateful protocol processing system.

FIG. 1B is a block diagram of a transport layer termination system within a typical computer system.

DETAILED DESCRIPTION OF THE PREFERRED EMBODIMENT

I. Overview of Stateful Protocol Processing

Figure 2:
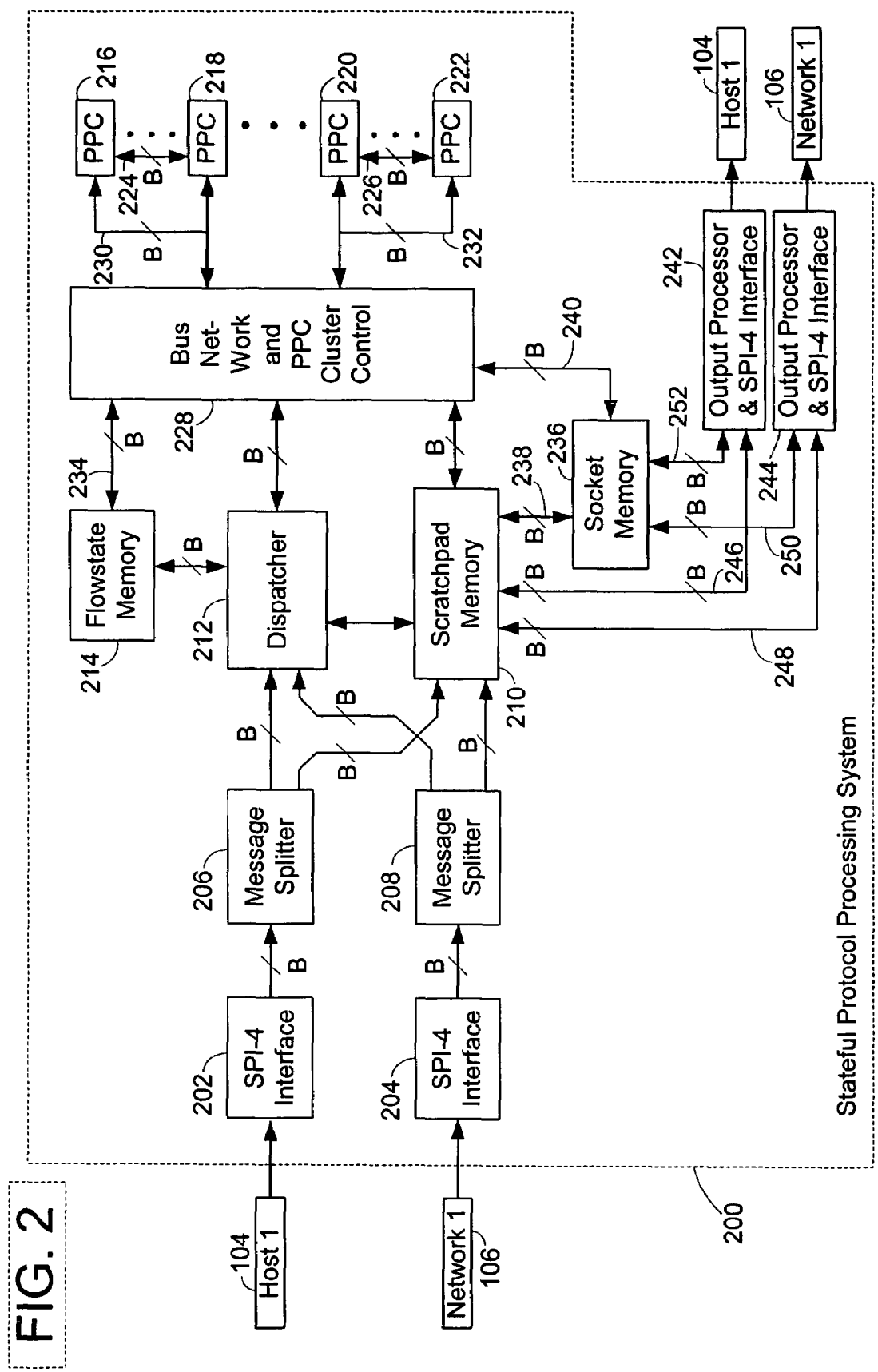
FIG. 2 is a more detailed block diagram of a stateful protocol processing system such as that of FIG. 1.

Stateful protocol processing entails processing data that arrives in identifiable and distinguishable units that will be referred to herein as "messages." A multiplicity of messages will belong to a "flow," which is a group of messages that are each associated with a "flow key" that uniquely identifies the flow. The methods and apparatus described herein for stateful protocol processing are most useful when a multiplicity of different flows is concurrently active. A flow is "active" whether or not a message of the flow is presently being processed, as long as further messages are expected, and becomes inactive when no further processing of messages belonging to the particular flow are expected.

A "stateful protocol" defines a protocol for treating messages belonging to a flow in accordance with a "state" that is maintained to reflect the condition of the flow. At least some (and typically many) of the messages belonging to a flow will affect the state of the flow, and stateful protocol processing therefore includes checking incoming messages for their effect on the flow to which they belong, updating the state of the flow (or "flowstate") accordingly, and processing the messages as dictated by the applicable protocol in view of the current state of the flow to which the messages belong.

Processing data communications in accordance with TCP (Transmission Control Protocol) is one example of stateful protocol processing. A TCP flow is typically called a "connection," while messages are packets. The flow key associated with each packet consists primarily of endpoint addresses (e.g., source and destination "socket addresses"). A flowstate is maintained for each active connection (or flow) that is updated to reflect each packet of the flow that is processed. The actual treatment of the data is performed in accordance with the flowstate and the TCP processing rules.

TCP is a protocol that is commonly used in TLT (transport layer termination) systems. A typical TLT accepts messages in packets, and identifies a flow to which the message belongs, and a protocol by which the message is to be processed, from information contained within the header of the packet. However, the information that is required to associate a message with a flow to which it belongs and a protocol by which it is to be processed may be provided in other ways, such as indirectly or by implication from another message with which it is associated, or by a particular source from which it is derived (for example, if a particular host is known to have only one flow active at a time, then by implication each message from that host belongs to the flow that is active with respect to that host.

Moreover, stateful protocol processing as described herein may be utilized in places other than TLT systems, in which case the information about flow and protocol may well be provided elsewhere than in an incoming packet header. For example, an incoming TCP packet may encapsulate data that is to be processed according to an entirely different protocol, in a different "layer" of processing. Accordingly, the stateful protocol processing effected within the context of a TLT system described herein provides a specific example of a general stateful protocol processing system ("SPPS"). Messages belonging to one stateful protocol flow may, for example, be encapsulated within messages belonging to a distinct stateful protocol. The well-known communication protocol referred to as "SCSI" provides examples of data communication at layers other than a transport layer. A common use of SCSI is between a host and a peripheral device such as a disk drive. SCSI communications may take place over a special purpose connection dedicated to SCSI communications, or they may be encapsulated and conveyed via a different layer. SCSI may be encapsulated within messages of some transport layer protocols, such as Fibre Channel and TCP. "FCP" is a protocol by which SCSI messages are encapsulated in Fibre Channel protocol messages, while "iSCSI" is a protocol by which SCSI messages are encapsulated in TCP messages. FCP and iSCSI are each stateful protocols.

One example of such encapsulation involves information belonging to a first stateful flow, such as an iSCSI flow, that is communicated over a local network within messages belonging to a distinct second stateful flow, such as a TCP connection. A first SPPS may keep track of the state of the encapsulating TCP connection (flow). The same SPPS, or a different second one, may determine that some of the messages conveyed by the encapsulating flow form higher-level messages that belong to an encapsulated iSCSI flow. The flow key of the encapsulated iSCSI flow may be contained within each encapsulated message, or it may be determined by implication from the flow key of the encapsulating TCP/IP packets that are conveying the information. Given knowledge of the flow key of the encapsulated flow, and of the protocol (iSCSI) by which the encapsulated flow is to be processed, the SPPS may maintain a state for the iSCSI flow, and may identify and process the messages associated with the flow in accordance with the specified protocol (iSCSI, in this example).

Thus, a transport layer termination system may provide a good example of a SPPS (stateful protocol processing system). Indeed, a TLT is likely to include at least some stateful processing, thus qualifying as a SPPS. However, a SPPS can be utilized for other data communication layers, and for other types of processing, as long as the processing includes updating the flowstate of a flow to which a multiplicity of messages belong, in accordance with a stateful protocol that is defined for the messages. Therefore, although the invention is illustrated primarily with respect to a TLT system, care should be taken not to improperly infer that the invention is limited to TLT systems.

FIG. 1A illustrates interface connections to a SPPS 100. A SPPS packet input processing block 102 may accept data in packets from any number of sources. The sources typically include a host connection, such as "Host 1" 104, and a network connection, such as "Network 1" 106, but any number of other host connections and/or network connections may be used with a single system, as represented by "Host N" 108 and "Network M" 110. A protocol processing block 112 processes incoming data in accordance with the appropriate rules for each flow of data (i.e., stateful protocol rules such as are defined by the well-known TCP, for stateful messages specified for processing according to such stateful protocol). Flows generally involve bidirectional communications, so data is typically conveyed both to and from each host connection and/or network connection. Consequently, a packet output processing block 114 delivers data to typically the same set of connections ("Host 1" 104 to "Host N" 108 and "Network 1" 106 to "Network M" 110) from which the packet input processing block 102 receives data.

FIG. 1B provides an overview of connections to a TLTS 150 that provides an example of a simple SPPS as implemented within a computing system 152. A single host system 154 is connected to the TLTS 150 via a connection 156 that uses a well-known SPI-4 protocol. The host 154 behaves as any of the hosts 104-108 shown in FIG. 1A, sending messages to, and receiving messages from, the TLTS 150. The TLTS 150 is connected to a Media Access Control ("MAC") device 158 via another SPI-4 protocol connection 160. The MAC 158 is connected to a network 162 via a suitable connection 164. The MAC converts between data for the TLTS (here, in SPI-4 format), and the physical signal used by the connection 164 for the network 162. The network 162 may have internal connections and branches, and communicates data to and from remote communications sources and/or targets, exemplified by as "source/target system 1" 170, "source/target system 2"180, and "source/target system 3" 190. Any number of communication source/targets may be accessed through a particular network. Source/target systems may be similar to the computing system 152. More complicated source/target systems may have a plurality of host and network connections, such as is illustrated in FIG. 1A. Thus, some source/target systems may effectively connect together a variety of different networks.

FIG. 2 is a block diagram showing modules of an exemplary SPPS 200. In one embodiment, two SPI-4 Rx interface units 202 and 204 receive data over standard SPI-4 16-bit buses that accord with "System Packet Interface Level 4 (SPI-4) Phase 2: OC-192 System Interface for Physical and Link Layer Devices. Implementation Agreement OIF-SPI4-02.0," Optical Internetworking Forum, Fremont, Calif., January 2001 (or latest version): The number of connections is important only insofar as it affects the overall processing capability needed for the system, and from one to a large number of interfaces may be connected. Each individual interface may process communications to any number of network and/or host sources; separate physical host and network connections are not necessary, but may be conceptually and physically convenient. Moreover, while SPI-4 is used for convenience in one embodiment, any other techniques for interface to a physical layer (e.g., PCI-X) may be used alternatively or additionally (with processing in the corresponding input blocks, e.g., 202, 204, conformed) in other embodiments.

II. Message Splitting

Still referring to FIG. 2, data received by the interfaces 202 and 204 is conveyed for processing to message splitter modules 206 and 208, respectively. The transfer typically takes place on a bus of size "B." "B" is used throughout this document to indicate a bus size that may be selected for engineering convenience to satisfy speed and layout constraints, and does not represent a single value but typically ranges from 16 to 128 bits. The message splitter modules 206 and 208 may perform a combination of services. For example, they may reorganize incoming messages (typically packets) that are received piece-wise in bursts, and may identify a type of the packet from its source and content and add some data to the message to simplify type identification for later stages of processing. They may also split incoming messages into "payload" data and "protocol event" (hereafter simply "event") data.

As the data arrives from the SPI-4 interface, a message splitter module such as 206 or 208 may move all of the data into known locations in a scratchpad memory 210 via a bus of convenient width B. Alternatively, it may send only payload data to the scratchpad, or other subset of the entire message. The scratchpad 210 may be configured in various ways; for example, it may function as a well-known first-in, first-out (FIFO) buffer. In a more elaborate example, the scratchpad 210 may be organized into a limited but useful number of pages. Each page may have a relatively short scratchpad reference ID by which a payload (or message) that is stored in the scratchpad beginning on such page can be located. When the payload overruns a page, an indication may be provided at the end of the page such that the next page is recognized as concatenated, and in this manner any length of payload (or message) may be accommodated in a block of one or more pages that can be identified by the reference ID of the first page. A payload length is normally part of the received header information of a message. The scratchpad reference ID may provide a base address, and the payload may be disposed in memory referenced to the base address in a predetermined manner. The payload terminates implicitly at the end of the payload length, and it may be useful to track the number of bytes received by the scratchpad independently, in order to compare to the payload length that is indicated in the header for validation. If the scratchpad also receives the header of a message, that header may be similarly accessed by reference to the scratchpad reference ID. Of course, in this case the payload length validation may be readily performed within the scratchpad memory module 210, but such validation can in general be performed many other places, such as within the source message splitter (206, 208), within the dispatcher 212, or within a PPC 216-222, as may be convenient from a data processing standpoint.

A. Event Derivation

A typical function of a message splitter 206, 208 is to derive, from the incoming messages, the information that is most relevant to stateful processing of the messages, and to format and place such information in an "event" that is related to the same flow as the message from which it is derived. For example, according to many transport layer protocols, "state-relevant" data including flow identification, handshaking, length, packet order, and protocol identification, is disposed in known locations within a packet header. Each stateful protocol message will have information that is relevant to the state of the flow to which it belongs, and such state-relevant information will be positioned where it can be identified. (Note that systems that perform stateful protocol processing may also process stateless messages. TLPs, for example, typically also process packets, such as Address Request Protocol or ARP packets, which are not associated with an established flow and thus do not affect a flowstate. Such "stateless" packets may be processed by any technique that is compatible with the presently described embodiments. However, these techniques are not discussed further herein because the focus is on the processing of stateful messages that do affect a flowstate for a message flow.)

The event that is derived from an incoming message by a message splitter module such as 206 or 208 may take a wide range of forms. In the simplest example, in some embodiments it may be the entire message. More typically, the event may exclude some information that is not necessary to make the decisions needed for TLP processing. For example, the payload may often be excluded, and handled separately, and the event may then be simply the header of a message, as received. However, in some embodiments information may be added or removed from the header, and the result may be reformatted, to produce a derived event that is convenient for processing in the SPPS.

B. Event Typing

Received messages may, for example, be examined to some extent by the interface (202, 204) or message splitter (206, 208) modules, and the results of such examination may be used to derive a "type" for the event. For example, if a packet has no error-checking irregularities according to the protocol called for in the flow to which the packet belongs, then the event derived from such package may be identified with an event "type" field that reflects the protocol and apparent validity of the message. Each different protocol that is processed by the SPPS may thus have a particular "type," and this information may be included in the event to simplify decisions about subsequent processing. Another type may be defined that is a message fragment; such fragments must generally be held without processing until the remainder of the message arrives. Message fragments may have subtypes according to the protocol of the event, but need not. A further event type may be defined as a message having an error. Since the "type" of the event may be useful to direct the subsequent processing of the event, messages having errors that should be handled differently may be identified as a subtype of a general error. As one example, error type events may be identified with a subtype that reflects a TLP of the event.

Any feature of a message (or of a derived event) that will affect the subsequent processing may be a candidate for event typing. Thus, event typing may be very simple, or may be complex, as suits the SPPS embodiment from an engineering perspective. Event typing is one example of augmentation that may be made to received message information in deriving an event. Other augmentation may include revising or adding a checksum, or providing an indication of success or failure of various checks made upon the validity of the received message. Relevant locations may also be added, such as a scratchpad location indicating where the message information may be found within the scratchpad memory 210. Note that if a message source that uses the SPPS, such as a host, is designed to provide some or all of such "augmenting" information within the message (e.g., the header) that it conveys to the SPPS, then the message splitter may not need to actually add the information in order to obtain an "augmented" event.

In addition to augmenting message information, event derivation may include reformatting the event information to permit more convenient manipulation of the event by the SPPS. For example, processing may be optimized for certain types of events (such as TCP events, in some systems), and deriving events of other types may include reformatting to accommodate such optimized processing. In general, then, events may be derived by doing nothing to a received message, or by augmenting and/or reformatting information of the message, particularly state-relevant information, to aid later processing steps. For TCP, for example, the resulting event may consist primarily of the first 256 bytes of the packet, with unnecessary information removed and information added to reflect a scratchpad location in which it is copied, the results of error checking, and the event typing. If a host is configured to prepare data in a form that is convenient, a resulting host event issued from the message splitter may be the first bytes of the message (e.g., the first 256 bytes), with few or no changes.

It may be convenient to implement the message splitter functions using an embedded processor running microcode, which lends itself to reprogramming without a need to change the device design. However, the message splitter function may alternatively be implemented via software executed in a general-purpose processor, or in an application specific integrated circuit (ASIC), or in any other appropriate manner.

Many alternatives are possible for the particular set of processing steps performed by message splitter modules such as 206 and 208. For example, a "local proxy" of the flow ID (i.e., a number representing the flow ID of the message that suffices to identify the flow within the SPPS and is more useful for local processing) could be determined and added to the event at the message splitter—a step that is performed during a later processing block in the illustrated embodiments. Also, it is not necessary that incoming messages be split at all. Instead, incoming messages may be kept together: for example, they may be stored intact in the scratchpad memory so as to be available to many parts of the system, or they may be forwarded in their entirety directly to the event dispatcher 212 and thence to the protocol processing cores (PPCs) 216-222 that are described below in more detail. If incoming messages are not split, then these modules 206, 208 might, for example, be renamed "packet preprocessors" to reduce confusion. The skilled person will understand that, in many cases, design convenience primarily determines which module performs any particular acts within a complex system.

III. Event Dispatcher

As shown in FIG. 2, the events prepared by the message splitters 206, 208 are forwarded to an event dispatcher module 212, where they may be entered into a queue. The event dispatcher module 212 (or simply dispatcher) may begin processing the incoming event by initiating a search for a local flow ID proxy, based on the flow identification "key" that arrives with the message.

A. Local Flow ID Proxy

The flow identification key (or simply "flow key") uniquely identifies the flow to which the message belongs in accordance with the TLP used by the flow. The flow key can be very large (typically 116-bits for TCP) and as such it may not be in a format that is convenient for locating information maintained by the SPPS that relates to the particular flow. A local flow ID proxy may be used instead for this purpose. A local flow ID proxy (or simply "local proxy ID," "local flow ID," or "proxy ID") generally includes enough information to uniquely identify the particular flow within the SPPS, and may be made more useful for locating information within the SPPS that relates to the particular flow. For example, a local flow ID proxy may be selected to serve as an index into a flowstate memory 214 to locate information about a particular flow (such as a flowstate) that is maintained within the SPPS. Not only may a local flow ID proxy be a more convenient representative of the flow for purposes of the SPPS, it will typically be smaller as well.

A local flow ID proxy may be determined within the dispatcher module or elsewhere, such as within the message splitter modules 206, 208 as described previously. Given the very large number of local flow ID proxies that must be maintained, for example, in large TLTSs (transport layer termination systems), determining the proxy ID may be a non-trivial task. If so, it may be convenient from an engineering perspective to make such determination by means of a separate "lookup" module, as described below. In some embodiments, such a lookup module may be a submodule of the message splitter modules 206, 208, or it may be a submodule of the dispatcher module, or it may be best designed as independent and accessible to various other modules.

A search for the local flow ID proxy may be simplified, or even eliminated, for events received from a host that is configured to include the local flow ID proxy rather than (or in addition to) the usual TLP flow key that will accompany flow messages on a network. Such a host configuration can reduce the workload of whatever module would otherwise determine the local flow ID proxy, e.g., the dispatcher. Another way to reduce the local flow ID proxy lookup effort may be to maintain a "quick list" of the most recently used flow IDs, and their associated proxies, and to check this list first for each arriving message or event.

If a message arrives that belongs to a flow for which no local flow ID proxy or flowstate is known, the dispatcher 212 may create a new local flow proxy ID. In many cases the dispatcher (or a lookup submodule) may then initialize a flowstate for such new flow. It may be useful to select such proxy ID as a value that will serve as a table entry into memory that may be used to store a flowstate for such new flow in a convenient memory, such as flowstate memory 214. Such memory may be quite large in large systems, requiring special management.

B. Memories

Each distinct "memory" described herein, such as the scratchpad memory 210 and the flowstate memory 214, typically includes not only raw memory but also appropriate memory controller facilities. However, the function of the memory controller is generally not central to the present description, which merely requires that the memory either store or return specified blocks of data in response to requests. Because SPPSs as described herein may be made capable of concurrently processing millions of active flows (or may be limited to processing a few thousand, or even fewer, active flows), and because a typical flowstate may be approximately 512 bytes, multiple GB of memory may be needed to implement the SPPS of FIG. 2. Techniques for implementing such large memories are known and constantly evolving, and any such known or subsequently developed technique may be used with any type of memory to form the SPPS of FIG. 2, so long as adequate performance is achieved with such memory. Memories are distinguished from each other as distinct memories if they function in a substantially independent manner. For example, distinct memories may be independently addressable, such that addressing a data item stored in one memory does not preclude simultaneously addressing an unrelated item in a distinct memory. Distinct memories may also be independently accessible, such that accessing an item in one memory does not preclude simultaneously accessing an unrelated item in a distinct memory. Due to such independence, distinct memories may in some cases avoid data access bottlenecks that may plague common (or shared) memories.

C. Lookup Submodule

The dispatcher module 212 illustrated in FIG. 2 may include submodules that perform particular subsets of the dispatcher tasks. For example, it may be useful to incorporate a separate "lookup" module to perform the function of looking up a local flow ID proxy based on the flow key that is included in the arriving event. Another function of the dispatcher 212 may be to establish and maintain flow timers for active flows, as may be required by the particular TLP associated with each flow. When it is convenient to maintain such flow timers in memory that is indexed by the local flow ID proxy, the lookup module may also conveniently perform the function of monitoring the flow timers. Also, the dispatcher 212 may provide the flowstate to a PPC when assigning it to process events of a flow. If the flowstate is similarly maintained in memory at a location indexed by the local flow ID proxy, then this may be another function that may conveniently be performed by the lookup module. Such a lookup module may be independent, or it may be essentially a submodule of the dispatcher. The lookup module could also be associated primarily with other sections of the system. For example, it could be primarily associated with (or even a submodule of) a message splitter module 206, 208, if that is where the lookup tasks are performed, or it could be primarily associated with the PPCs 216-222 if the lookup tasks were performed primarily there.

The lookup process may require extensive processing, such as a hash lookup procedure, in order to select or determine a local flow ID proxy based on raw flow identification or "flow key." As such, a lookup module (or submodule) may be implemented with its own microprocessor system and supporting hardware. When flow ID proxy determination is performed by a lookup module (or submodule), the dispatcher may assign and transfer an event to a PPC without waiting for the determination to be completed, and the lookup module can later transfer flow information (obtained by use of the local flow ID proxy) to the assigned PPC without further interaction with the dispatcher.

Once a "lookup" or other submodule is established as a distinct entity, it may as a matter of design convenience be configured to perform any of the tasks attributed to the dispatcher (or other module in which it is located or with which it is associated, and indeed in many cases may perform tasks that are attributed, in the present description, to other modules, such as the message splitter modules. The ability to move functionality between different functional modules is a common feature of complex processing systems, and the skilled person will understand that moving functionality between modules does not, in general, make a system significantly different.

Many other functions may be performed by the dispatcher 212, or by its submodules. For example, the dispatcher may request a checksum from the scratchpad memory 210 reflecting the payload of the message, combine it with a checksum included with the event that covers that portion of the message converted into the event, and incorporate the combined checksum into the event. A bus of modest size is shown between the dispatcher 212 and the other processing blocks that is sufficient for this purpose. As with many dispatcher functions, this function could be performed elsewhere, such as in the message splitter blocks 206, 208, or during later processing.

D. Director Submodule

Another module, or dispatcher submodule, may be created to perform some or all of the decision making for the dispatcher. Such submodule, which will be referred to as a "Director," may perform the steps involved in selecting a particular PPC to handle a particular event of a flow, and keeping track, for the overall SPPS (stateful protocol processing system), of the status of active flow processing in the various PPCs.

The "flow processing status" maintained by the Director submodule may indicate, for example, that other events of the flow are presently being processed by a PPC, or that a new flowstate generated after PPC processing of a previous event (of the flow) is presently being written to the flow state memory. It may also indicate if the flow is being torn down, or that a timer event is pending for that flow. Such flow processing status information may be used, for example, to cause the Director submodule to delay the forwarding of an event to a PPC when appropriate, such as to avoid overwriting a flowstate while the flow processing status of a flow says that its flowstate is being written from a PPC to the flowstate memory. Once the update of the flowstate memory is complete, as reflected by the flow processing status, the new event may be forwarded to a PPC.

The Director submodule's flow processing status information may also be used, for example, to prevent timer expirations from being improperly issued while a flow is being processed by a PPC. Such timer events should not be issued if the very act of processing an event may cause such a timer expiration to be cancelled. The Director submodule may refer to the flow processing status information before allowing timer events to be issued to PPCs, so that such timer events are issued only when no other events are active for that flow. As with the lookup submodule, organization of the Director as a distinct module may permit the dispatcher to simply hand off an incoming event to the Director.

E. Protocol Processing Cores and Buses—Structural Introduction

Having established a local flow ID proxy for a message, the dispatcher 212 determines where the message event (or entire message, if messages and events are not split) should be processed in accordance with the TLP associated with the flow. In some embodiments, the bulk of such TLP processing is performed by a Protocol Processing Core ("PPC"). A cluster having a number of PPCs is represented by the PPCs 216 through 218, while PPCs 220 and 222 represent another cluster of PPCs. Two PPC clusters are shown, but any number of such PPC clusters may be used. For example, one TLTS embodiment may comprise only a single cluster of PPCs, while a complex SPPS embodiment may include hundreds of clusters. Two of the PPCs in a cluster are shown in FIG. 2, but two or more PPCs may be used in any given cluster, with five PPCs per cluster being typical. Though it may be convenient for design symmetry, the number of PPCs in each cluster need not be identical. The particular organization of PPCs into clusters is selected, in part, to facilitate the transfer of data by reducing bus congestion. Each cluster may utilize an intracluster intercore bus 224 (or 226) interconnecting PPCs of each cluster, and each cluster will typically be connected to a bus network and control block 228 by a bus 230 or 232. Data between the dispatcher 212 and the PPCs may be organized by a bus network and control block 228. The bus network and control block 228 functions primarily as a "crossbar" switch that facilitates communication between a variety of modules, as described in more detail below.

PPCs (e.g., 216-222) typically include a processor core and microcode (i.e., some form of sequential instructions for the processor core) that enables the PPC to process events that are submitted to it. They also typically include local memory, which the PPC can access without interfering with other PPCs, sufficient to hold the relevant flowstate data of a flow that the PPC is processing. It will typically be convenient to maintain much or all of the flowstate of a particular flow in the local memory of the PPC processing a message event for that flow. The PPC local memory may be organized into a number of blocks or "workspaces" that are each capable of holding a flowstate. PPCs will typically have a queue for incoming events, and workspaces for several different flows having events in the queue that are concurrently being processed by the PPC.

The buses represented herein are described as being bidirectional in nature. However, if convenient, the buses may be implemented as two one-way buses that in some cases will not be of equal bit-width in both directions. Thus, a bus indicated as having a width B bits represents a bus width that may be selected for convenience in a particular implementation, and may be directionally asymmetrical. The typical considerations for bus size apply, including space and driver constraints of the physical layout, and the required traffic needed to achieve a particular performance target. The buses are not shown exhaustively; for example, a message bus may usefully be connected (for example by daisy-chaining) between all of the physical pieces of the TPTS, even though such a bus is not explicitly shown in FIG. 2. Moreover, if the SPPS is implemented as program modules in software or firmware running on a general processing system, rather than in a typical implementation that employs ASICs having embedded microprocessors, the buses represented in FIG. 2 may represent data transfer between software modules, rather than hardware signals.

F. Assigning Events to a PPC

In some embodiments of the present invention, the dispatcher 212 selects a particular PPC to process events associated with a particular flow. There are a number of considerations for such assignment. First, the PPC must be one of the PPCs that are compatible with, or configured to process, events of the type in question. Such compatibility may be determined in the dispatcher, or in a flow processing status subsystem of the dispatcher, by means of a table of PPCs that indicates the event types or protocols the PPC is compatible with, which may in turn be compared with the protocol or event type requirements of the incoming event. In some embodiments the event is marked with an indication of its "type" at another stage of processing, for example in the message splitter module. The dispatcher then needs only select a PPC that is compatible based on the predetermined "type" of the event. Typically, the event types will be so defined that all messages having state-relevant information for a particular flow will also have the same event type, and can be processed by the same PPC. Thus, a PPC will be selected from the constellation of PPCs that can process the indicated event type.

A PPC is selected from this constellation of compatible PPCs according to an algorithm that may, for example, compare PPC loading to find a least-loaded PPC, or it may select a PPC in a round-robin manner, or it may select PPCs randomly. Typically, events of each flow are specifically directed to a PPC, rather than being directed to a PPC as a member of a class of flows. Such individualized processing of each flow permits load balancing irrespective of the attributes of a class of flows. When flows are assigned as members of a class, such as one that shares certain features of a flow ID (or flow key), it may happen that a large number of such a class needs to be processed concurrently, overwhelming the capacity of a PPC, while another PPC is unloaded. This effect may be accentuated when flows are assigned to PPC in classes that have a large number of members. While many embodiments assign each flow uniquely (in a class size of one), it may be effective in some embodiments to assign flows in classes, particularly small classes or classes whose membership can be changed to balance loading.

Similar effects for load balancing may be achieved, even if flows have been assigned in a large class, if a mechanism is provided for releasing specific flows from assignment to particular PPCs. In many embodiments, both assignment and release of flows to PPCs is done for individual or specific flows. Finally, even if both assignment of flows to a PPC, and release of flows from a PPC, is performed for classes of flows, an equivalent effect may be achieved by making the classes flexibly reassignable to balance loading. That is, if the class that is assigned to a PPC can be changed at the level of specific flows, then loading can be balanced with great flexibility. In each case it is possible to change the flows assigned to a PPC in singular units, such that a flow is ultimately assigned to a PPC essentially irrespective of any fixed class attributes, such as characteristics that hash a flow ID to a particular value, and similarly irrespective of other flows that may be assigned to that PPC (or to another PPC).

After selecting a PPC, the dispatcher 212 forwards the event to the PPC together with instructions regarding a flow-state "workspace." As mentioned above, the decisions for selecting a PPC may be performed in the Director submodule of the dispatcher. In a typical embodiment, the dispatcher 212 first determines if an incoming event belongs to a flow that already has events assigned to a particular PPC. A submodule, such as a Core Activity Manager that tracks the activity of PPCs, may perform this determination in some embodiments, while in others embodiments the Director submodule may perform these functions. In the case that a PPC is already assigned for events of the flow of the incoming event, the incoming event is typically forwarded to the same PPC, which may already have the flowstate present within its local memory.

However, if no PPC is presently assigned to the flow, then the dispatcher selects a particular PPC, for example the PPC 216, to process the incoming event (or assigns the flow to the particular PPC). Selection may be based upon information of the Core Activity Manager, which maintains activity status that can be used to balance loading on the various (compatible) PPCs. The Director submodule may perform the actual assignment and balancing decisions, and in some embodiments the Director and the Core Activity Manager are substantially a single submodule having a dedicated processor and program code to perform these tasks. The assignment may be simply "round robin" to the compatible PPC that has least recently received an event, or on the basis of PPC queue fullness, or otherwise.

After a PPC 216 is assigned to process the incoming event, a workspace is selected in the local memory of the PPC 216 and the current flowstate of the flow of the incoming event is established in the selected workspace. Selection of the workspace may be done by the dispatcher module (for example, by its Director submodule), or otherwise, such as by the PPC on a next-available basis. The flowstate may be established in the selected workspace in any convenient manner. For example, the dispatcher may send the flowstate to the PPC via the dispatcher (e.g., as an action of the lookup submodule), or the PPC itself may request the flowstate from a memory (e.g., the flowstate memory 214). The event is typically delivered from the dispatcher 212 to an input queue of the PPC 216, and is associated with the selected workspace. Also, separately or as part of the event, the size and location of the data payload in scratchpad memory (if any) is typically conveyed to the PPC 216. Having this information, the PPC 216 will be able to process the event when it is reached in the queue, as described subsequently in more detail. When the PPC 216 finishes processing a particular event, it will, in some embodiments, transmit a "done" message to the dispatcher 212, so that the dispatcher can track the activity of the PPC. A submodule such as the Core Activity Module or the Director may, of course, perform such tracking.

G. Counting Events to Track Active Flow Processing

Having transmitted an event to a selected PPC (216), the dispatcher 212 increments an event counter in a location associated with the flow (and thus with the PPC 216). The event counter may be maintained in a local memory block, associated with the local flow ID proxy, that is reserved for such information about current PPC processing (e.g., in the core activity manager within the dispatcher), or in another convenient location. The event counter is incremented each time an event is sent to the PPC, and is decremented each time the PPC returns a "done" message for that flow. As long as the event counter is non-zero, a PPC is currently processing an event for the associated flow. When the event counter reaches zero for a particular flow, the PPC (216) no longer has an event to process for the particular flow, and those of its resources that were allocated for processing the particular flow may be released to process other flows. Note that the PPC 216 may be processing events of other flows, and that its release from processing the particular flow may be made irrespective of such other flows.

If the event counter associated with the flow of an event arriving at the dispatcher 212 is not zero, then it may be preferable to assign and transfer the arriving event to the same PPC. In some embodiments, if a PPC is already processing an event, the global (i.e., flowstate memory 214) version of the flowstate is no longer valid. Rather, only the flowstate in the PPC workspace is valid. In such embodiments, the valid flowstate in the present PPC workspace should be made available to a subsequently selected PPC, which in turn should be done only after the present PPC is finished processing the event. Accordingly, at least in such embodiments, it will generally be more convenient to assign the same PPC to process arriving events belonging to a selected flow until that PPC completes all pending events for the selected flow.

An event arriving at the dispatcher 212 for a specified flow that is already assigned to a PPC may sometimes need to be transferred, or assigned to a different PPC. In such a case it may be convenient to retain the event in the dispatcher 212 until the current PPC completes processing all events it has been assigned. Holding the event in the dispatcher 212 avoids the need to coordinate two PPCs that are simultaneously updating a flowstate for the particular flow. Before such handover occurs, it may also be convenient to allow the PPC to "check-in" its workspace (memory reflecting the present flowstate) to the Flow Memory before assigning the new PPC. Alternatively, the workspace may be transferred from the current PPC directly to the new PPC after all events of the current PPC queue have been processed.

If an event arrives at the dispatcher for a flow that is active, but the related event counter is zero when an event arrives at the dispatcher 212 (indicating that no PPC is presently assigned to the flow), then the dispatcher (or its Director submodule) will select a PPC that is available to process that event type. The selection is typically independent of previous processing, and may be based on various factors such as load sharing and event-type processing capability. As such, the PPC selected next will likely differ from the PPC that previously processed events belonging to the flow. However, in some embodiments consideration may be given to previous processing of a particular flow by a particular PPC, such as when the PPC in fact retains useful state information. Once the PPC selection is made, processing continues as described previously, with the event conveyed to the new PPC, and the flowstate disposed in a local workplace selected within the PPC. The dispatcher 212 either transfers the current flowstate to the new PPC or indicates where in the flowstate memory 214 the present flowstate is to be found.

An event counter is just one means that may be used to determine whether a particular PPC is presently processing a previous event of the same flow. Alternatively, for example, the PPC presently processing an event of a flow might flag the dispatcher 212 when it finds no events in its input queue associated with an active workspace. Any other appropriate procedure may also be used to determine whether a PPC is presently assigned to processing a particular flow.

H. Updating Flowstate and Releasing a PPC

A PPC may be released from responsibility for processing events of a particular flow after the associated event counter reaches zero. Such a release means that the PPC may be assigned to process events of a different flow, since it will generally therefore have a workspace free. In general, the PPC may be processing other flows at the same time, and the release does not affect the responsibilities of the PPC for such other flows. In the typical circumstance that the event counter (or other indication) shows that events of a particular flow may be reassigned to another PPC for processing, the SPPS is enabled to balance PPC processing loads by shifting specific individual flows between different PPCs (of those able to handle the event types of the flow) independently of other flows that may be handled by the PPCs. As compared with techniques that cause PPCs to handle events for a class of flows (such as a class of flows whose flow keys have certain characteristics), such independent flow assignment may reduce the statistical probability that one or more PPCs are idle while another PPC is processing events continuously.

Before a PPC is released, the flow memory that has been updated by the PPC (216) is stored where it will be available to a different PPC that may be selected at a later time to process the same flow. This may be accomplished in any appropriate manner, for example by transferring the contents of the relevant PPC workspace to the dispatcher 212 and thence to the flowstate memory 214. Alternatively, the PPC (216) may convey the flowstate information to a known location in the flowstate memory 214 in cooperation with the dispatcher 212, so that the dispatcher is aware that the flowstate has been updated and is ready for future access. The flowstate may be conveyed more directly from the PPC (216) to the flowstate memory 214, such as via a bus 234 from the bus network and control block 228. The bus 234 may be used for either "checkout" of a flowstate from the flowstate memory 214 to a PPC, or for "check-in" of an updated flowstate from a PPC to the flowstate memory 214. When the event counter reaches zero, and the flowstate has been checked-in to the flowstate memory 214, the present PPC may be released and the flow will revert to a condition reflecting that no PPC is currently assigned to it. Within the PPC, the flowstate workspace may be indicated as free.

An alternative to storing flowstates in the flowstate memory 214 may be used in some embodiments. For a SPPS that is provided with sufficient memory local to the PPCs, the flowstate may be maintained in a workspace of the last PPC that processed it until such time as it is needed elsewhere, such as in another PPC. In such embodiments, the flowstate may be transferred to the appropriate workspace in the new PPC via an intra-cluster bus such as 224 or 226. This is more likely to be a practical alternative for small SPPSs that handle a limited number of concurrent flows.

IV. Socket Memory and Output Processing

In TLP applications that guarantee message delivery, for example TCP, one requirement is the confirmation that a sent message was correctly received. In these TLPs, if the message is not correctly received, the message should be retransmitted. Because it may be some time before a request for retransmission arrives, transmitted messages need to be maintained in memory (e.g., in a "send buffer") for some period of time. Send buffering may be required even before first transmission, for example when the output target (e.g., Host1 104 or Network 1 106 in FIG. 2) is not ready to accept data. Similarly, a "receive buffer" is frequently required. For example, messages may be received out of order, or as fragments, and these must be saved for a period of time to comply with TCP rules that require completing the messages and putting them in the correct order. While messages could simply be stored in the scratchpad memory 210, for large systems entailing large send and receive buffers, it may be more convenient to establish a separate "socket memory" 236 to store large quantities of data for somewhat extended times. Such a socket memory 236 may interface with the scratchpad memory 210 via a bus 238 as shown in FIG. 2, and with the bus network and PPC cluster control 228 via another bus 240. (Due to substantial traffic, in some embodiments, the bus 240 may actually comprise several individual bus structures.)

The socket memory 236 may provide data intended for output to an output processor and SPI-4 Interfaces 242, 244 via buses 246 and 248. However, when data to be output is still present in the scratchpad memory 210, in some instances it may be quicker to provide the data to the output processors 242, 244 directly via buses 250, 252. The output processing may include tasks such as the preparation of message headers, primarily from the event data, calculation of checksums, and assembly of completed output messages ("reassembly"). The event typically retains some type of TLP or event type identification, and the output processors may use this information to determine the proper format for headers, cyclic redundancy checks (CRCs) and other TLP bookkeeping information. After a message is reassembled by the output processor, the SPI-4 portion of the output units 242 and 244 formats the message according to the SPI-4 (or other selected) interface protocol, so that the data may be output to the same connections (for example "Host 1" 104 and "Network 1" 106), from which data is received at the input to the SPPS.

V. Protocol Processor Core Functions

Once a PPC has received an event of an appropriate type, and has information reflecting the size and location of any payload, it may direct treatment of the entire message in accordance with the TLP being used. The PPC may direct actions regarding the flow to which the event belongs, e.g. requesting retransmission, resending previously transmitted messages, and so on, and may update the flowstate for the flow as is appropriate. In some embodiments, traffic congestion can be reduced if the PPCs do not physically transfer messages directly to the output processors (242, 244), but instead simply direct other circuits to transfer the messages for reassembly at the output processors 242, 244.

Some outgoing messages contain very little information (e.g., little or nothing more than a header), such as acknowledgements or requests for retransmission. In these cases, the PPC that is processing the event (e.g., PPC 216) may form a header based upon the event information and pass it to the socket memory 236. The socket memory 236 may, in turn, do little or nothing to the header information before passing it on to one of the output processors 242, 244. Other outgoing messages will include a substantial payload, which may, for example, have been received with an incoming message and stored in the scratchpad memory 210. The PPC may direct such payloads to be moved from the scratchpad memory 210 to the socket memory 236, and may separately direct one of such payloads to be concatenated, for example in one of the output processors 242, 244, with an appropriate header formed by the PPC. The skilled person in the computer architecture arts will recognize that the PPC can control the output message and flowstate information in many ways.

PPCs may be implemented in any manner consistent with their function. For example, a microprogrammable processor provides one level of flexibility in processing varying communication needs. Some or all PPCs could alternatively be implemented as fixed state machines, in hardware, possibly reducing circuit size and/or increasing processing speed. Yet again, some or all PPCs may comprise embedded microprocessors that are operable out of program memory that can be modified "on the fly," even while the SPPS is active. Such an implementation permits adjusting the number of PPCs able to process particular types of events, adding further load-balancing flexibility. PPCs may be configured to process some stateful protocols, and not others, and the configuration may be fixed or alterable. For example, in a PPC based on a microprogrammable processor, the microprogram (or software) typically determines which event types, or protocols, the PPC is configured to process. A PPC is "compatible" with a particular event type, or protocol, when it is configured to process such event types, or to process messages (events) according to such a protocol.

VI. Bus Network and PPC Cluster Control

Figure 3:
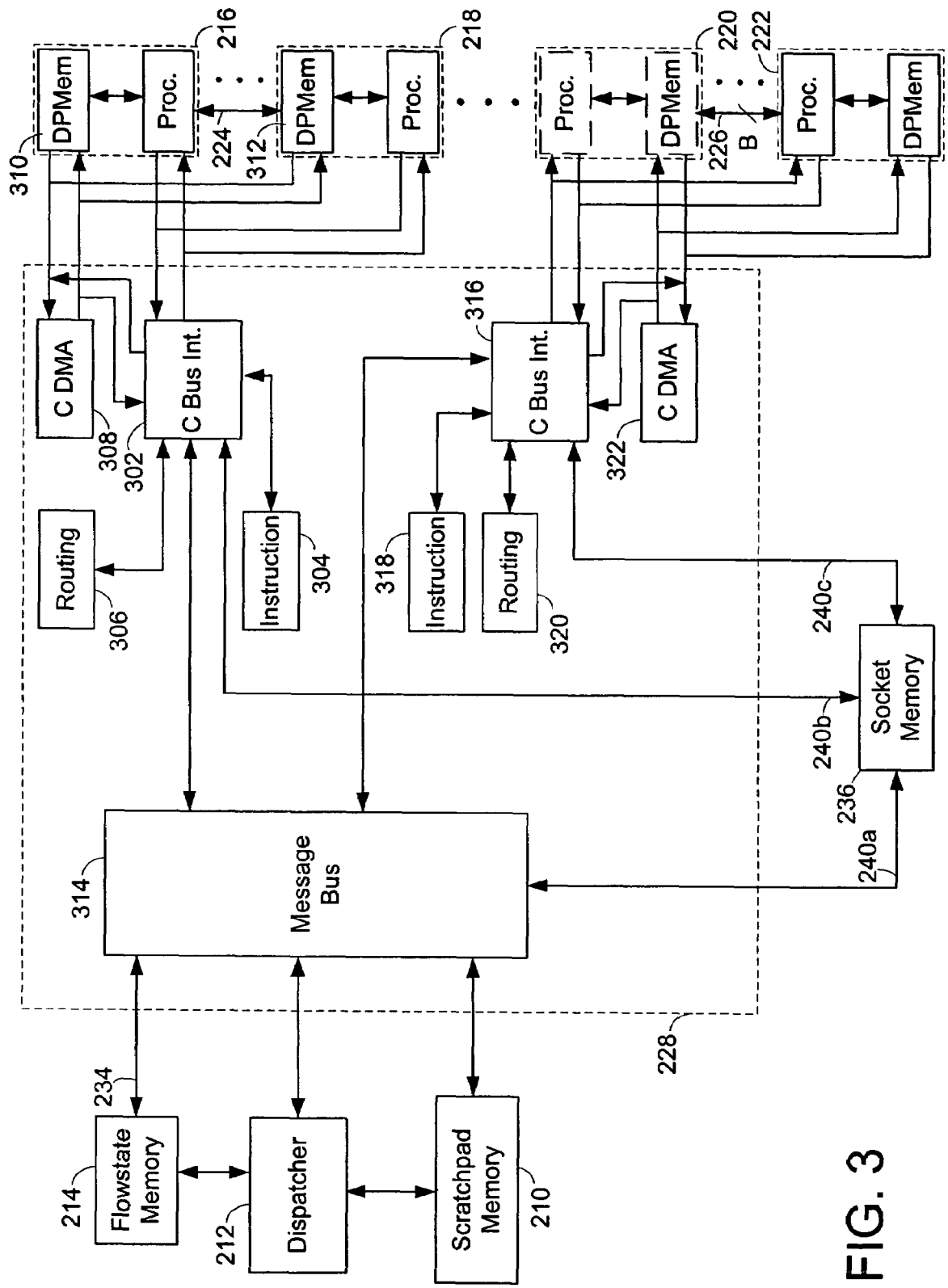
FIG. 3 is a block diagram showing further details of some of the features of the stateful protocol processing system of FIG. 2.

FIG. 3 illustrates an exemplary architecture for the bus network and PPC cluster controller 228 of FIG. 2. In this embodiment, the cluster of PPCs (from 216-218) is controlled in part via a cluster bus interface 302. Through the cluster bus interface 302, instructions are available for all of the PPCs (216-218) in the cluster from an instruction memory 304, typically implemented using RAM. The cluster bus interface 302 may also provide access to a routing control table 306 for all of the PPCs in the cluster. A cluster DMA controller 308 ("C DMA") may be provided, and may have an egress bus that delivers data from a FIFO of the DMA controller 308 to the cluster bus interface 302, as well as to one side of a dual port memory (e.g., the DPMEM 310, 312) of each of the PPCs 216-218 of the cluster. The DPMEM 310, 312 is accessible on the other side from the DMA controller to the corresponding processor with which it is associated as part of a PPC 216, 218. As shown in FIG. 3, the cluster DMA controller 308 may have a separate ingress bus by which the FIFO receives data from the dual port memory (e.g., the DPMEM 310, 312) and from the cluster bus interface 302. The DMA controller 308 may be used, for example, to transfer flowstates between the PPC local memory and the flowstate memory 214. As shown in FIG. 3, the cluster bus controller 302 also provides bidirectional bus connections to a message bus 314, and a further bidirectional bus connection 240b to the socket memory 236. Some or substantially all of the local memory of a PPC may be DPMEM such as the DPMEM 310, but any suitable local memory may be used instead, as may be convenient for design and fabrication.

The bus 240 interconnecting the socket memory 236 and the bus network and PPC cluster control 228 is shown in FIG. 3 as being implemented by three distinct bidirectional buses: the bus 240a interconnecting the socket memory 236 and the message bus 314; the bus 240b as mentioned above; and the bus 240c to a further cluster bus interface 316. The cluster bus interface 316 operates with respect to the cluster of PPCs 220-222 analogously to the cluster bus interface 302, as a crossbar switch to facilitate communication between the PPCs and the message bus 314, the socket memory 236, and to provide access to common instruction memory 318 and a routing table 320. A further cluster DMA 322 similarly manages data flow between the dual port memory of the PPCs 220-222 and the cluster bus interface 316. Further sets of similar modules (routing, instruction, cluster bus interface and cluster DMA) may, of course, be provided and similarly interconnected.

The skilled person in the computer architecture arts will appreciate that any suitable bus control may be used to implement the connections shown for the bus network and PPC cluster control 228. For example, the routing and instruction information may be maintained within individual PPCs. In addition, the PPC memory need not be dual-port, nor is a DMA controller such as 308 or 322 necessary. In somewhat less complex embodiments, the cluster bus interfaces 302, 316 may simply be part of the message bus 314, or the interfaces may be omitted entirely. Conversely, even more elaborate bus architectures may be employed to increase the speed and power of some embodiments.

VII. Flow Processing with Alternate Protocol Cores

Figure 4:
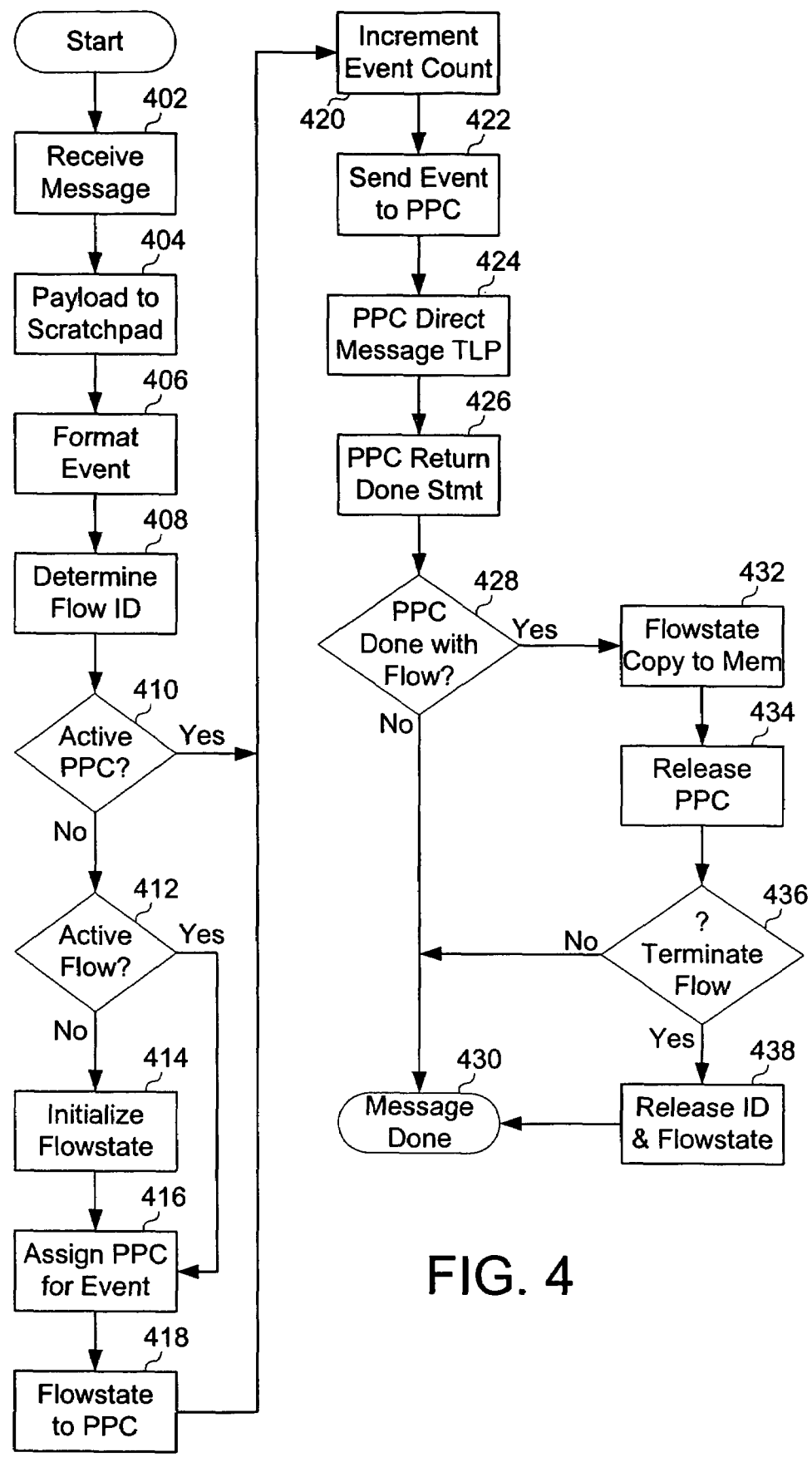
FIG. 4 is a flowchart of acts used in varying the protocol core that is selected to process a flow.

FIG. 4 is a flowchart showing acts that may be performed by an exemplary SPPS to perform stateful protocol processing of messages belonging to a flow, generally alternating PPCs (protocol processing cores), that is, using different PPCs at different times. As shown in FIG. 4, at a step 402 a message is received. This step may include various substeps, such as reconstructing complete messages from packet fragments, performing validity checks, and/or establishing checksums. Next, at a step 404, the payload of the message may be moved to a scratchpad memory. The step 404 is optional, insofar as it indicates splitting the message and storing part of the message in a temporary memory location that is especially available to both input and output processing facilities. Alternatively, for example, the message may be kept together, and/or it may be moved directly to a more permanent memory location.

Proceeding to a step 406, an event portion of the message may be defined. Event definition typically includes the state-relevant portion of the message, and may entail reformatting a header of the message and adding information, such as checksums and event type indication, to facilitate further processing of the event, as discussed in more detail hereinabove. If the message is not split, the "event" may include the payload information, and may even be an incoming message substantially as received. Processing of the event proceeds at a step 408 where data contained within the event that uniquely identifies the flow (the "flow key") is examined to begin a process of determining a location of flowstate information and a local flow ID proxy. A decision step 410 checks whether a PPC is actively processing an event of the same flow. This check may be effected by searching for the flow key in a local "active flow" table. If the flow key is found in the "active flow" table, then a PPC is presently processing another event belonging to the same flow, and the process exits the decision step 410 on the "yes" branch. If the flow is not active (e.g., if the flow key of the flow is not found in the "active flow" table), then processing continues at a decision step 412. Other techniques may be used in the step 410 to determine if events associated with the flow key are presently being processed by any PPC, such as searching an area of memory reserved for the status of message flows that are presently being processed by a PPC (e.g., within a dispatcher's Core Activity Management submodule). Alternatively, for example, a single flowstate location may be examined for an indication (e.g., a flag) that processing is in progress at a PPC. Further techniques and criteria for determining whether a PPC is actively processing the flow are described below with reference to a decision step 428.

At the decision step 412 a check is made as to whether the flow associated with the flow key is active at the SPPS. This may be performed by checking for a valid flow location in a flow memory that maintains flowstates for active flows when no PPC is presently processing events of the flow. (Since the number of active flows can be very large, the flow memory is typically distinct, separately accessible, and much larger, than the local flow table used for flows presently being processed by a PPC.) This step typically includes a "lookup" task of determining a local flow ID proxy related to the flow key, a task which may involve processing the flow key information according to hash algorithms. Once the local flow ID proxy is determined, it can generally be used to locate an existing flowstate for the flow corresponding to the flow key. The mere existence of a valid flowstate may cause an affirmative result at the decision step 412.

If the flow is not active at all, so that no valid flowstate exists in either general flowstate memory or in a PPC actively processing a flow, then the process proceeds to an initialization step 414 to create and initialize a valid flowstate area within flowstate memory. Note that some stateless "events" exist that do not require a flowstate, such are Address Resolution Protocol (ARP) events which do not belong to a flow, and for which no flow need be created. ARP, and other such "stateless" events, may be processed independently of the processing steps of FIG. 4, which are primarily relevant to "stateful" events.

Once an active flow is established (whether located at the decision step 412, or initialized at the initialization step 414), the method may proceed to assign a PPC to process the event at an assignment step 416. This step may involve several substeps, such as determining and identifying which PPCs are compatible (i.e., capable of processing events of the present type) and available (e.g., have room in their queues) to process the event. A PPC may be selected from those satisfying both of these criteria in many ways, such as in a round-robin fashion, or by selecting the least full PPC local queue, or randomly, or by other load balancing algorithms. Because the PPC has just been newly assigned to process the event, the flowstate is made available to the PPC at a step 418. The flowstate may be delivered by the dispatcher (or submodule) as described above; or, if a global flowstate memory is shared with the assigned PPC, then this step may comprise identifying the flowstate memory location to the PPC. The step 418 also typically includes identifying the location of a "workspace" where the PPC can access the flowstate during processing. Such workspace is typically maintained locally at the PPC, but in some embodiments may be maintained more globally, or split to be both local and global.

Once a PPC has been assigned and has a valid flowstate, which occurs after the step 418 (or after an affirmative step 410), processing proceeds at the steps 420 and 422. Step 420 tracks the activity of a PPC processing a flow. In one embodiment of the present invention, step 420 includes incrementing an event counter associated with the assignment of the PPC to process the flow, but alternatives are described below with regard to the decision step 428.

At a step 422 the contents of the event are provided to the assigned PPC. This may be accomplished by physically copying the event contents to a queue in the local memory of the PPC, or, as an alternative example, by identifying a location of the event data to the PPC. Such queue may contain events from different flows, for example from as many different flows as workspace storage is available for corresponding flowstates. If either event queue or flowstate workspace is not available in (or for) a compatible PPC, then the dispatcher may temporarily withhold effecting part or all of the event/workspace transfer to the PPC.

Once transfer is completed, the assigned PPC has access to the flowstate of the flow, and to the event data, which typically includes information regarding the size and location of the payload associated with the event. At a step 424, the PPC may perform much of the transport layer protocol processing for the message that is associated with the event. The protocol defines the net effect that such processing must achieve, but of course the effect may be accomplished in any manner either presently practiced or later developed for such transport layer processing. Actions by the PPC may include, as examples, updating the flowstate, creating a header for a message to be output, directing that a previously transmitted message be retransmitted, or sending a request for retransmission of a message that was received with an error. Actions by the PPC may also include directing the reassembly of a header it constructs to a received payload, and transmission to a different TLTS connected to the network at another end of the flow, or to a local host. Upon completing the event, a done statement is asserted at a step 426.

In one embodiment, the done statement is returned to a global dispatcher used to track PPC activity.

A. Releasing an Active PPC

After the PPC completes processing the present event, a determination is made at a decision step 428 whether the PPC has completed all processing for the flow to which the event belongs. In one embodiment, such determination may be made by a dispatcher module decrementing an event counter associated with a PPC in response to a "done" statement, and determining that the event counter has reached zero. However, many alternatives for establishing that a PPC is done with the flow will be appropriate in different embodiments. For example, a PPC may be considered "done" with a flow when it completes processing the last event of that flow that exists in its queue. As another example, the PPC may be considered done with a flow when the flowstate in its local memory is overwritten or invalidated by processing in another PPC. These, or other definitions of "done," may be tracked in one (or more) of various places, such as within the PPC itself, or at a more global module such as a dispatcher (e.g., within a core activity manager submodule).

If, at the decision step 428, the PPC is determined to be actively processing the flow, the method may proceed to a conclusion step 430 with no further processing, since the flowstate local to the PPC has been updated and the global flowstate need not necessarily be updated. However, upon determining that the PPC is done with processing the flow, the local flowstate that has been updated at the PPC is transferred to a more global flowstate location at a step 432, so that the PPC workspace becomes available for processing events of a different flow. The global flowstate can then be subsequently accessed when further events arrive that belong to the flow. The PPC may be deemed "done" based on event processing completion for the flow as determined by the dispatcher, by a submodule or other module, or by the PPC itself. The "done" designation may also be postponed after the processing of all events from the flow is completed, for example until the PPC has no other room for new flows and events. Once the PPC is deemed "done" at a step 434, the PPC may be released from "assignment" to processing the flow, which may, for example, include setting a flag that indicates that the flowstate memory in the PPC is no longer valid, or is available for further storage of a different flowstate. After the step 434, the PPC will be treated as free of the event, and of the flow to which the event belongs.

A decision step 436 will typically occur at some point to determine whether the last event processed by the PPC permits the flow to be completely closed. This decision step 436 may be made even before the occurrence of the decision step 428, or before the steps 432 and/or 434, because such a decision to terminate the flow may obviate a need to write the flowstate to memory. Such a decision may also subsume the decision that the PPC is "done" with the flow. However, for processing convenience, the termination decision may be considered as occurring in the sequence shown in FIG. 4. The PPC itself will typically determine, as part of its TLP processing duties, whether the last event completed the flow (e.g., whether the flowstate is advanced to the "connection closed" condition). However, a decision to actually close the flow may be made more globally, such as at the dispatcher (or a submodule). If it is determined at the decision step 436 not to terminate the flow, the system is generally done processing the message and proceeds to the done step 430. However, if it is determined at the step 436 to terminate the flow, the local flow ID proxy and flowstate memory location may thereupon be released for other uses. Since PPCs are generally assigned to, and released from processing events belonging to a flow at the level of a specific flow, largely irrespective of where other flows are assigned (at least within the universe of compatible PPCs), it is possible, indeed highly probable, that a PPC is assigned to process events (or messages) belonging to a flow that was previously processed by another PPC. Such flow-PPC reassignments may be rather frequent, and under some circumstances may even occur for each event of a flow.

VIII. Dispatcher Processing

Figure 5:
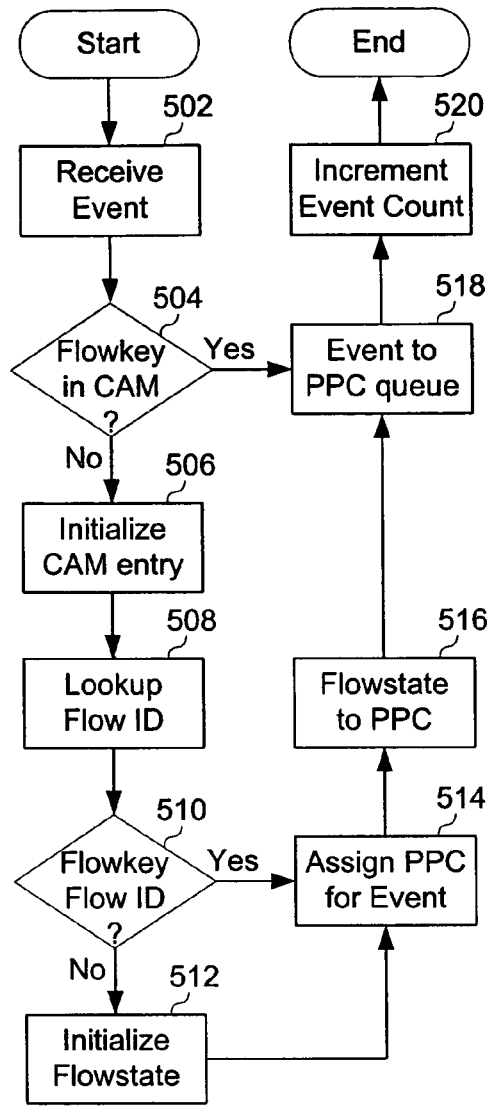
FIG. 5 is a flowchart of acts performed by a dispatcher module in response to receiving an event belonging to a flow.

FIG. 5 is a flowchart showing acts that may be taken by a "dispatcher" module within an exemplary SPPS to dispatch events belonging to a flow to different PPCs at different times. FIG. 5 is focused on acts, which may be generally attributed to a dispatcher module (and submodules), to effect distribution of incoming events. Thus, FIG. 5 steps may substantially be a subset of steps of the overall SPPS, such as are illustrated in FIG. 4, although FIG. 5 steps are from the dispatcher module perspective and may also include different details than are shown in FIG. 4. The dispatcher module is conceptually separate from the PPCs to which it dispatches events, and from input processing from which it receives events, and may be connected within a SPPS like the dispatcher 212 in FIG. 2, or may be otherwise connected. The dispatcher module may also be conceptually or even physically subdivided; for example, reference is made to a local flow ID proxy (and/or flowstate) "lookup" module, and to a Director Core Activity Manager, each of which may either conceptually or physically be a submodule of the dispatcher module, or an ancillary module associated with the dispatcher.

As shown in FIG. 5, at a step 502 an event is received from an input source. The event will typically contain only a "state-relevant" part of a message being processed by the SPPS. That is, the event will typically contain only the information necessary for a PPC (protocol processing core) to control the maintenance of the flowstate of the flow associated with the message, and not the payload of the message. However, in some embodiments the payload, or parts of it, may be kept with the state-relevant data. The dispatcher examines a "flow key" contained within the event that uniquely identifies the flow to which the event belongs. At a step 504, the dispatcher searches for a match to the flow key in a Core Activity Manager (or "CAM"), which would indicate that a PPC was actively processing an event related to that flow. If a match is not found in the CAM (which may be physically or conceptually separate from the dispatcher), then in this exemplary embodiment it is presumed that no PPC is actively processing an event of the flow, and at a step 506 a CAM entry will be initialized to track the activity of the PPC assigned to process the event.

At a step 508, the dispatcher searches for a local flow ID proxy that corresponds to the flow key. For SPPSs that handle a large number of flows, this search may be performed by a distinct lookup module which may, for example, perform a hash lookup to locate a local flow ID proxy as quickly as possible. A decision step 510 depends on whether a local flow ID proxy matching the flow key was found. If not, then the SPPS may not yet be processing any data from the flow, and accordingly at a step 512 a flowstate ID may be selected to be associated with the flow that is uniquely identified by the flow key of the event. Thereafter (or if a local flow ID proxy was found and the decision at the step 510 was "yes"), processing may proceed at a step 514.

A PPC is selected to handle the event at the step 514. This step may include a substep of determining the type of event being processed, though in some embodiments this substep is performed by earlier processing modules (e.g., a message splitter such as 206 or 208 of FIG. 2). An "event-type mask" maintained in the dispatcher for each PPC may be compared to bits indicating the type of event to determine which PPCs are compatible with the event type. Another substep may include examining the relative activity levels of those PPCs that are configured to handle the event type. The least busy PPC may be selected, or the next PPC that has any room in its input queue may be selected in a round-robin fashion. As a further example, data may be maintained on recent PPC activity (e.g., in a core activity manager submodule) including assignment of local workspaces, and a PPC may be selected that has not yet overwritten its flowstate memory for the flow of the event, even though it is otherwise considered "done" with the flow. A director submodule, either in combination with or as part of a core activity manager (CAM) submodule, may perform these acts. Selection of a PPC (within the universe of compatible PPCs) is generally made for the flow of each incoming event specifically, without regard to an a priori class of flows to which the flow might belong (such as by virtue of characteristics of its flow key). As a result of such individual assignment techniques, the PPC selected to handle a particular event of a flow frequently differs from a PPC that handled previous events of the same flow (unless the particular flow is presently active in a PPC, as explained elsewhere).

Since the flowstate was initialized in the step 512, or was located in the steps 508-510, and the PPC was selected at the step 514, the flowstate may now be transferred to the PPC at a step 516. In some embodiments such transfer may be "virtual," merely providing an indication of where the flowstate exists in memory so that the PPC can access it. Next, processing can proceed to a step 518. This same step may be reached directly from the decision step 504, since if that decision was "yes" then a PPC is already processing an earlier event belonging to the same flow. Such an active PPC will (in many embodiments) already have the most valid flowstate for the flow, and in that case will generally be selected to process the present event. Therefore, at the step 518, the event itself may be forwarded to an input area or queue of the selected PPC. Along with the step 518, an event counter may be incremented at a step 520. The event counter is one way to determine when a PPC is actively processing another event of the flow of the present event, but other ways may be used, such as waiting for the PPC to indicate that it is done processing all present events of a particular flow. This is the end of the receive processing for the dispatcher.

Figure 6:
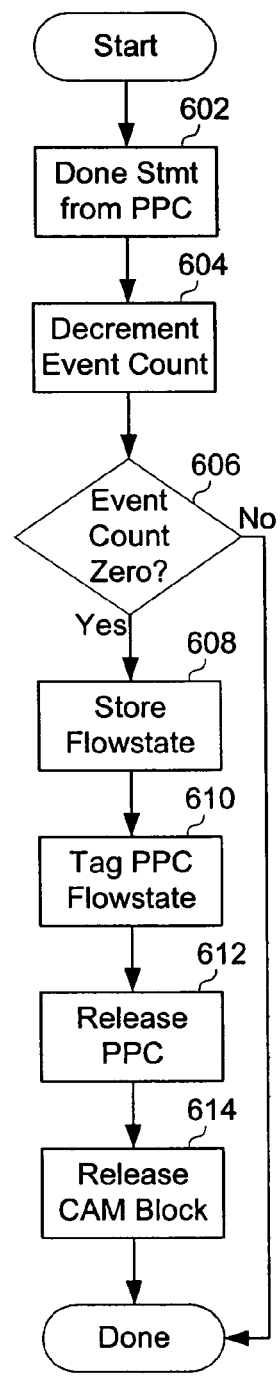
FIG. 6 is a flowchart illustrating certain acts that the dispatcher module (or its submodules) may perform in response to feedback from a protocol processing core.

FIG. 6 is a flowchart illustrating some steps that the dispatcher (or its submodules) may perform in response to feedback from the PPC. As in FIG. 5, the steps of FIG. 6 are largely a subset of steps taken by the overall SPPS, but they are described from the perspective of the dispatcher, and may contain more or different steps than are illustrated in FIG. 4 for the overall SPPS.

The illustrated response acts of FIG. 6 start at a step 602 during which the dispatcher receives a "done statement" or other indication that a PPC has completed processing an event of a particular flow. The dispatcher may then decrement the event counter for the flow (discussed with respect to the step 520 of FIG. 5). If, at a decision step 606, the event counter is found to have reached zero, or if the completion of a "burst" of events by a PPC is otherwise indicated, then the dispatcher may cause the flowstate, as updated by the PPC, to be stored in more permanent memory to free up the memory of the PPC. (Note that this step is not needed for embodiments in which the same memory is used by the PPC during processing as when no PPC is processing the memory, a circumstance that may occur, for example, when the flowstate is always maintained in the same global location, and is merely accessed by a PPC processing the flow, as needed). A flag or other indication may then be included in the CAM, or sent to the PPC, to indicate that the flowstate stored in the PPC is no longer valid. Then at a step 612, the PPC may be released from handling the particular flow it was processing. Since no active PPC is now processing an event of a particular flow, the CAM block in which the PPC activity was maintained can also be released at a step 614.

Note that "release" may amount to merely setting a flag showing that the PPC (or the CAM memory block) is available. Such flag may indicate availability, but a PPC may be treated for all intents and purposes as if it is still actively processing events of a flow after such indication, as long as no essential data has been overwritten. In that case, the decision step 606 would return a "no" until the data blocks are actually overwritten and thus destroyed. In any case, if the decision step 606 returns a "no," then processing is done, since the steps 608-614 are generally not needed in that event. Otherwise, processing is done after the CAM block is released at the step 614.

IX. Encapsulated Stateful Flow Processing

One manner in which a SPPS (stateful protocol processing system) such as described herein may process flows of layers other than transport layers is by extracting the encapsulated messages and recirculating the extracted messages for further processing. Such further processing may be performed in accordance with the appropriate protocol for the encapsulated message, which is typically different from the protocol (typically a TLP) used for the encapsulating messages.

After an encapsulated stateful message is retrieved, reformatted and provided to a SPPS as an input (a non-transport layer input), the SPPS can process the message in accordance with the appropriate protocol as long as one or more of the PPCs are configured with the steps required by the particular protocol (e.g., iSCSI). Thus, it is straightforward to simply use a SPPS for non-transport layer processing.

There are numerous ways in which a SPPS may be notified that encapsulated data requires recirculation. Notification may be implicit, for example, if all processed data requires recirculation. Alternatively, one or more portions of the header or payload of the encapsulating messages may contain information indicating a need for such recirculation. A SPPS may examine each payload for an indication to recirculate encapsulated information, or it may examine payloads only when an indication is provided in the header. Thus, the SPPS may receive instruction as to whether a payload is to be examined, whether it requires further processing, and by what protocol such further processing should be performed, by any combination of implicit and explicit information in the header and/or payload of the encapsulating message.

A "recirculation" protocol may first be invoked such that the payload (and/or portions of the header) of an encapsulating message is segmented and reassembled as a message for the encapsulated flow. Note that a single encapsulating message may contain all or part of a plurality of encapsulated messages, and that conversely a single encapsulated message may require a plurality of encapsulating messages to be conveyed (for example, when a large message is encapsulated in a plurality of small packets, such as ATM packets). The recirculation protocol defines appropriate reassembly of the encapsulated message, and also directs that it be returned to the input of the SPPS for further processing. Such a recirculation protocol may format the recirculated message in a particularly efficient format, such as by specifying the local flow ID proxy, the event type, and other useful information as is known. In this manner the SPPS recirculation protocol processor(s) would function similarly to a host operating in close conjunction with the SPPS. Such a host, having knowledge of an ideal format for messages to the SPPS, may speed processing by formatting messages in such ideal format.

It should also be noted that recirculation may be effected by a modified communication path, such that the reassembly or "output processors" 242 and/or 244 transfer the reassembled encapsulated message directly back to a message splitter 206 or 208, rather than passing it through interfaces such as the SPI-4 interfaces in 242, 244, 202 and 204 which may be unnecessary for recirculation. Indeed, the recirculated message may be entirely preformatted in the manner that would otherwise be effected by the message splitters 206 or 208. The selected PPC processing the encapsulating message (or a related processor) may perform such preformatting and direct the information to be delivered directly from the reassembly processors in 242/244 to the scratchpad memory 210 and the dispatcher 212, thus bypassing the message splitters entirely.

Once recirculation has been effected, further processing of the encapsulated information may proceed just as described hereinabove, that is, in substantially the same manner that a TLP message is processed. In the case of interest, the encapsulated information is stateful and belongs to a flow, so an event may be created that reflects the state-relevant portion of the message, a local proxy of the flow key will be determined, a state for the flow will be created or located, and a PPC (protocol processing core) compatible with the protocol will be assigned to process the event derived from the (previously encapsulated, now recirculated) message. These steps may be performed not only for recirculated messages, but for messages of any flow, whether transport layer or not, that is provided to an input of the SPPS.

Processing a non-transport layer message may, of course, require that information be sent to a further subsystem. For example, data within an encapsulated message may require delivery to a host. The assigned PPC may effect such sending by directing that the information be reassembled in a manner acceptable to the target host, and then directing that the reassembled message be transferred to the target host. In an alternative, sending the encapsulated message to a network connection may require that the outgoing message be reencapsulated in a TLP message (typically, but not necessarily, the same TLP, such as TCP, that was used for the original encapsulating message). Thus, further recirculation may be required at this point to reencapsulate such message. In theory, at least, messages may be "nested" in a series of any number of encapsulations that must be stripped off before the innermost stateful message can be processed. Similarly, processing such innermost stateful message may require symmetrical reencapsulation of a message. In practice, excessive encapsulation will be avoided in the interests of efficiency.

X. Failover within an SPPS

The present invention is directed to a unique technique for failing over a TCP or similar connection from an active to a standby system. The present invention is capable of effecting failover both within the context of proxied TCP connections, as well as in the more general case of arbitrary TCP connections. As is described herein, the present invention exploits the characteristic of TCP and other connection-oriented protocols that requires a sender to retain a copy of data transmitted across a connection until an acknowledgement is received. In accordance with the invention, such an acknowledgement is allowed to be sent only after the transmitted data has been "committed" to a receiving destination. In the event of failure of a device or system involved in supporting the TCP or other connection, a "standby" element is activated in order to replicate the state of the connection as of the time of completion of a prior synchronization operation involving such standby element.

A. System Environment

Figure 7:
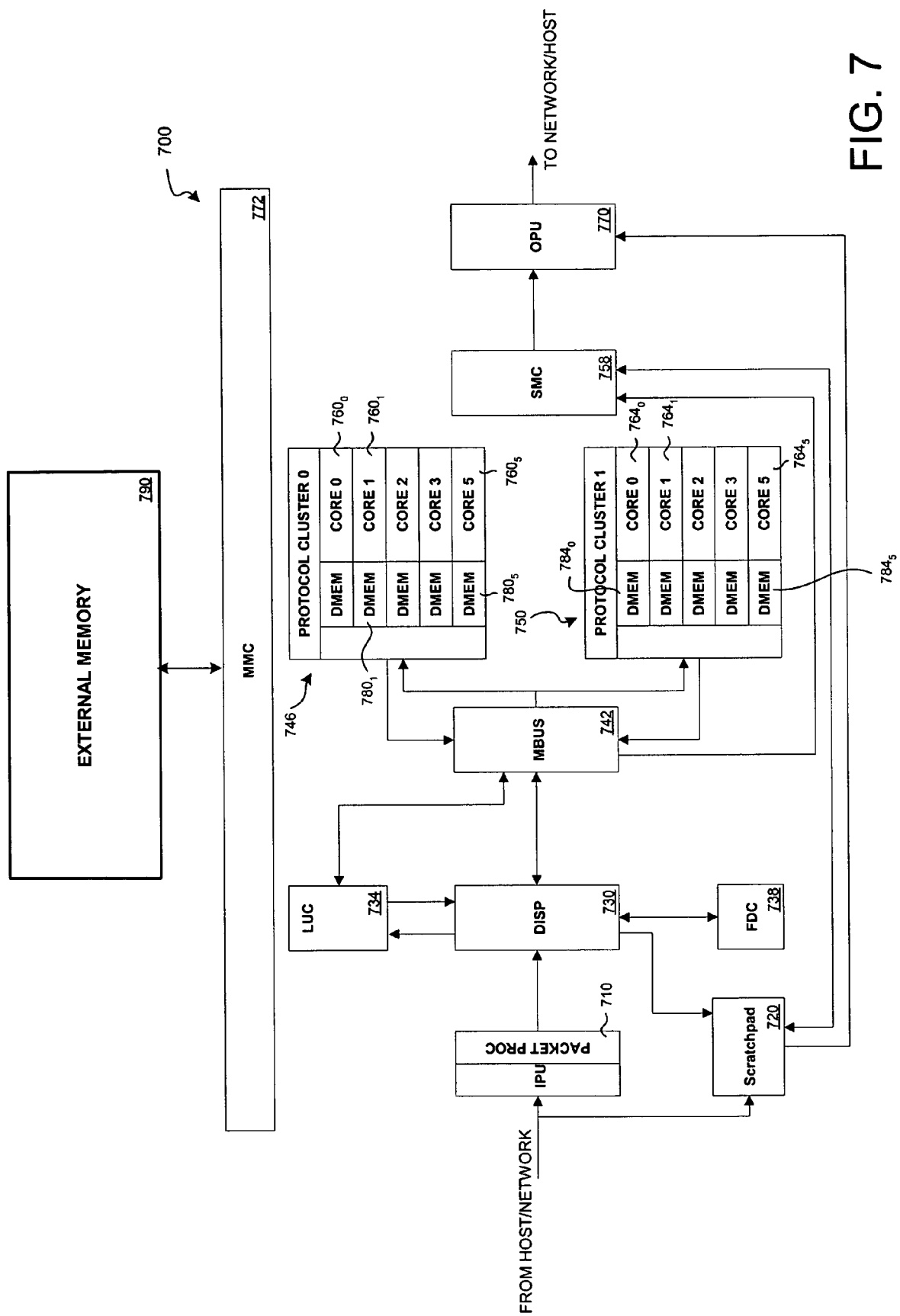
FIG. 7 is a block diagram of a particular implementation of a multi-processor stateful protocol processing system (SPPS) to which reference will be made in describing the manner in which the present invention implements failover for connection-oriented protocols.

FIG. 7 is a block diagram of a particular implementation of a multi-processor stateful protocol processing system (SPPS) 700 to which reference will be made in describing the manner in which the present invention implements failover for connection-oriented protocols. Referring to FIG. 7, received packets are initially processed by an input processing unit (IPU) 706 and a packet processor (PP) 710 encapsulated therein. These elements are in communication with scratchpad memory 720 as well as with a dispatcher 730. As shown, the dispatcher 730 interacts with both a look-up controller submodule (LUC) 734 and a flow director CAM 738 (FDC). A message bus 742 communicatively links the dispatcher with a first protocol cluster 746 and a second protocol cluster 750. In addition, the message bus 742 provides a link to a socket memory controller (SMC) 758, which is also in operative communication with an output processing unit 770. The dispatcher 730, FDC 738 and LUC 734 will typically share a common Management and Control (MMC) interface 772.

During operation of the SPPS 700, the PP 710 is the initial processing element encountered by a message received from an external network or host. The PP 710 is configured to derive, from the incoming messages, the information that is most relevant to stateful processing of the messages, and to format and place such information in an "event" that is related to the same flow as the message from which it is derived. For example, according to many transport layer protocols, "state-relevant" data including flow identification, handshaking, length, packet order, and protocol identification, is disposed in known locations within a packet header. Each stateful protocol message will have information that is relevant to the state of the flow to which it belongs, and such state-relevant information will be positioned where it can be identified.

Received messages are examined by the PP 710 in order to determine a "type" for the event derived from the message. Each different protocol that is processed by the SPPS 700 may thus have a particular "type," and this information may be included in the event to simplify decisions about subsequent processing. Since the "type" of the event may be useful to direct the subsequent processing of the event, messages having errors that should be handled differently may be identified as a subtype of a general error. Upon generating an event of a type corresponding to a received packet, the PP 710 performs certain stateless processing consistent with the applicable event type (e.g., verifies certain fields in a packet header have legal values) and extracts an event-type-specific "flow key".

The flow identification key (or simply "flow key") uniquely identifies the flow to which the message belongs in accordance with the TLP used by the flow. The flow key can be very large (typically 116-bits for TCP) and as such it may not be in a format that is convenient for locating information maintained by the SPPS 700 that relates to the particular flow. A local flow ID proxy may be used instead for this purpose. A local flow ID proxy (or simply "local proxy ID," "local flow ID," or "proxy ID") generally includes enough information to uniquely identify the particular flow within the SPPS 700, and may be made more useful for locating information within the SPPS that relates to the particular flow. For example, a local flow ID proxy may be selected to serve as an index into an external or "flowstate" memory 790 to locate information about a particular flow (such as a flowstate) that is maintained within the SPPS 700. Not only may a local flow ID proxy be a more convenient representative of the flow for purposes of the SPPS 700, it will typically be smaller as well.

A flow key comprises a unique identifier of a state object used in later "stateful" processing of an event; that is, the flow key is used to retrieve an associated state object from external memory 790, take some prescribed action based upon the event type and current state, generate output events, update the state object, and wait for arrival of a new packet to precipitate generation of another event. In the exemplary embodiment extraction of the flow key from an event is accomplished by the PP 710, which sends the extracted flow key to the dispatcher 730.

As shown in FIG. 7, an event derived by the IPU 706 are forwarded to the dispatcher 730, where it may be entered into a queue. In turn, the dispatcher 730 identifies which of the processor cores 760, 764 within the protocol clusters 746, 750 are capable of processing the event. The dispatcher 730, in cooperation with the LUC 734, also coordinate lookup of the corresponding flow state or "workspace" within external memory 790 using the flow key associated with the event. The dispatcher 730 also cooperates closely tied with the FDC in tracking which flows are currently being processed by the SPPS 710. In the exemplary embodiment the dispatcher 710 uses the type number associated with the event to index a table (not shown) containing information as to which processor cores 760, 764 are capable of processing the applicable event type.

The SMC 758 administers one send buffer and one receive buffer per each flow being processed by the SPPS 700. In addition, the SMC 758 organizes physical memory into pools based on page sizes. In one exemplary implementation, the SMC 758 supervises implementation of four distinct page sizes, and different page sizes are selected by the SMC 758 based upon the buffering requirements of different protocols. For instance, a protocols predicated upon packets of small size would benefit from small buffers and small page sizes, while protocols using large packets would benefit from large buffers. Advantageously, the SMC 758 enables the appropriate buffer sizes to be concurrently used for multiple different protocols. The SMC 758 is further configured to organize a list of pages so that each processor core 760, 764 can store and retrieve data based on a virtual buffer offset number.

B. Overview of Failover Within a TCP-Based SPPS

Figure 8:
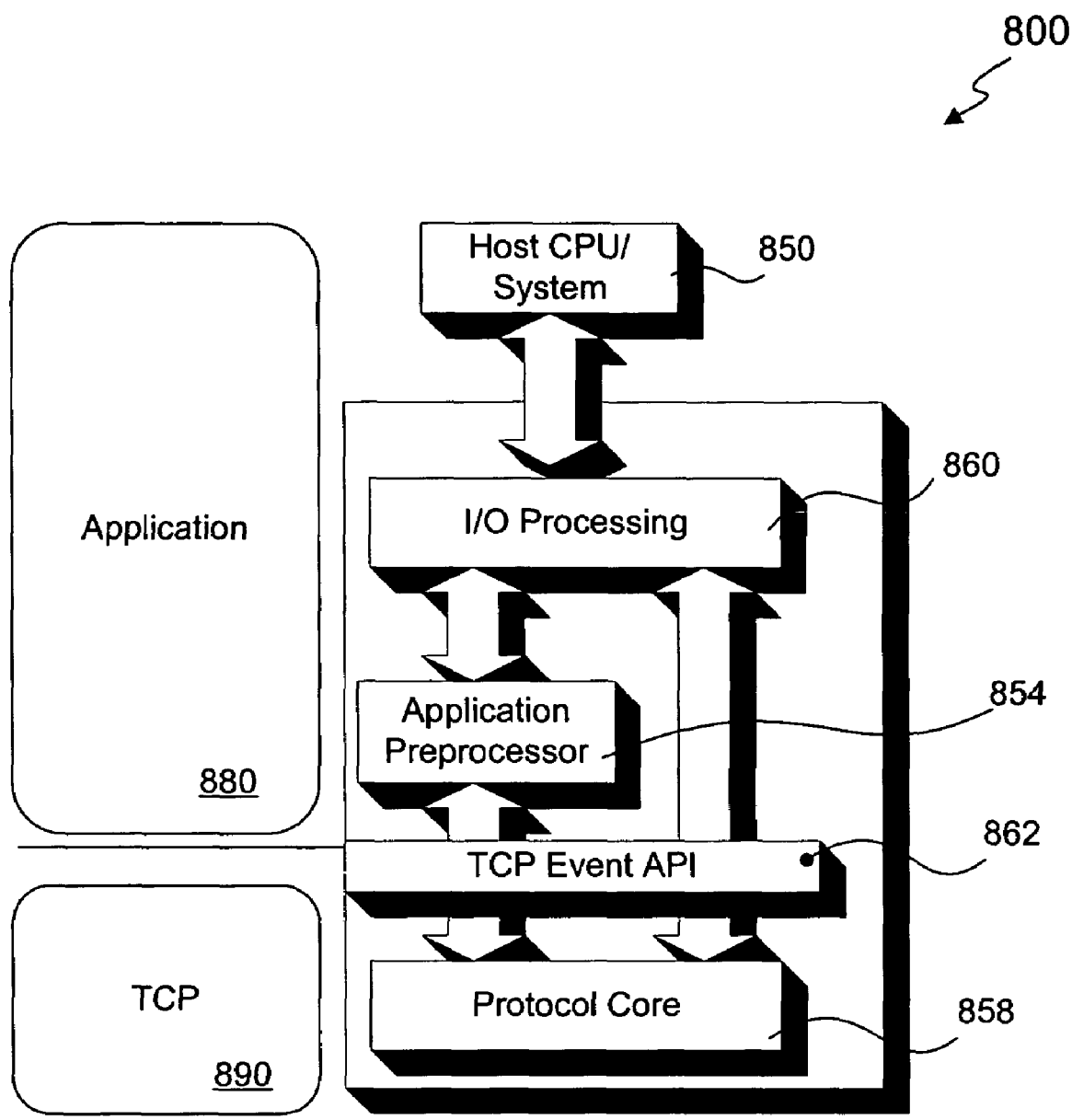
FIG. 8 provides an alternate representation of an SPPS to which reference will be made in describing the principles of the inventive failover technique.

FIG. 8 provides an alternate representation of an SPPS 800 to which reference will be made in describing the principles of the inventive failover technique. The SPPS 800 incorporates the functionality of all of the components of the SPPS 700 described above, but is represented from a different perspective in order to simplify explanation of the failover technique of the present invention. As shown, the SPPS 800 includes an application preprocessor 854, protocol core 858 and an I/O processing unit 860. In the illustration of FIG. 8, the I/O processing unit 860 is representative of all of the components within the SPPS 700 other than the protocol clusters 746, 750.

As is indicated by FIG. 8, the SPPS 800 may be driven from both a processor in a host system 850 and an internal application preprocessor 854. Although FIG. 8 depicts only a single application preprocessor 854 and one protocol core 858, exemplary realizations will generally contain multiple application preprocessors and multiple protocol cores disposed to execute in parallel. Customized application software may be developed for execution by the application preprocessor 854, which communicates with the protocol core 858 through a TCP event API 862 via messages (events) consistent with the TCP protocol. The protocol core 858 will generally execute embedded software designed to implement the full TCP protocol "stack", which is represented in FIG. 8 as TCP 890. Since this embedded software also automatically manages multiprocessor semantics, any application software developed for the application preprocessors is not directly "aware" that multiple physical application preprocessors may exist. As used hereinafter, the term application refers to application software 880 that runs either inside the SPPS 800 on the application preprocessor 854 or outside the SPPS 800 on the host 850.

Figure 9:
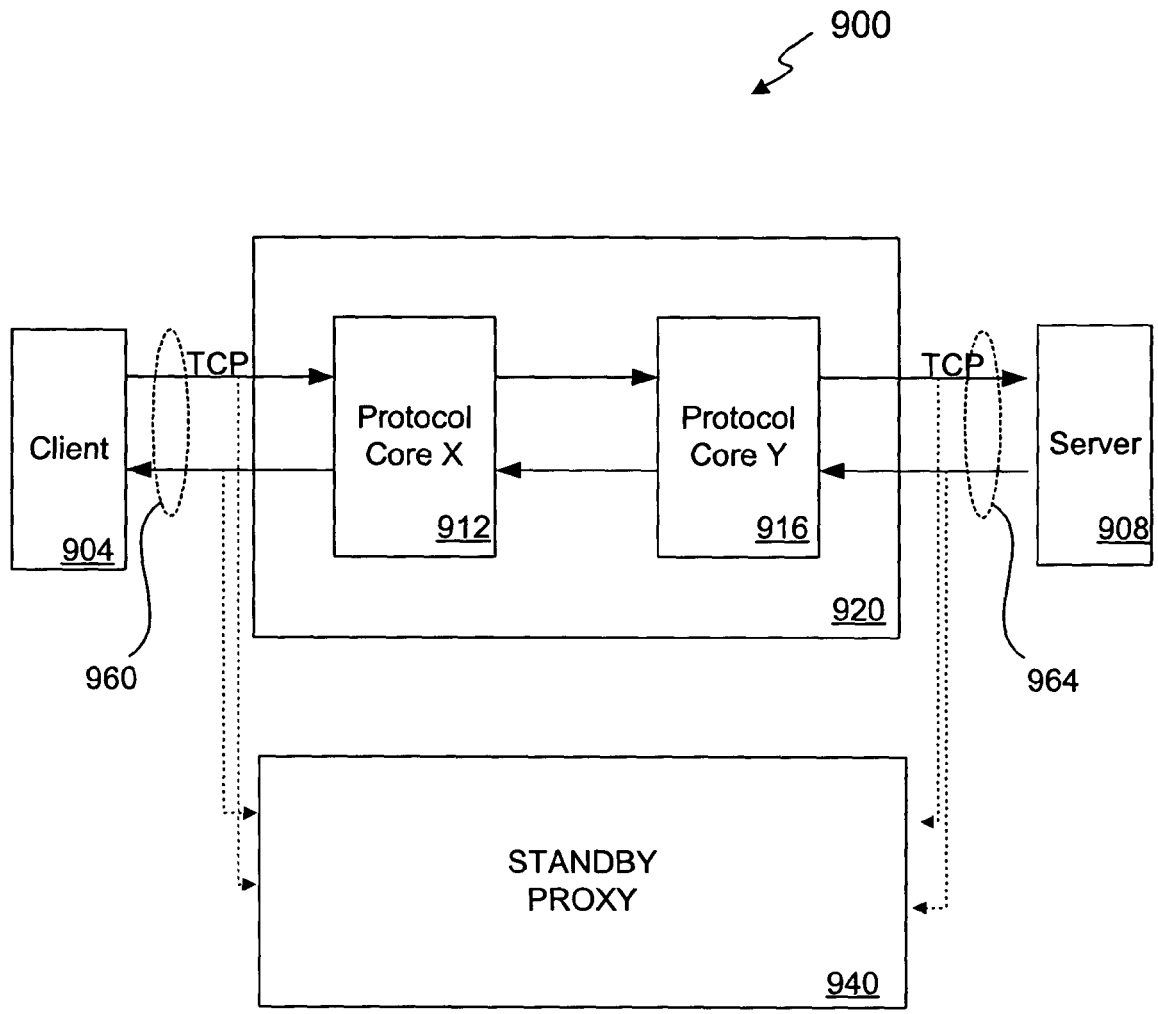
FIG. 9 provides a simplified view of a set of elements involved in establishing a proxied TCP connection to which the inventive failover technique may be applied.

Turning now to FIG. 9, there is provided a simplified view of a set of elements 900 involved in establishing a proxied TCP connection to which reference will be made in describing the principles of the inventive failover technique. In the implementation of FIG. 9, the TCP-based proxy connection is maintained between a client device or computer 904 and a server device or computer 908. The TCP-based proxy connection effected by the elements 900 consists of a pair of separate TCP connections "gatewayed" together through a proxy 920. In an exemplary embodiment the functionality of the proxy 920 may be implemented by executing the SPPS 800 in the manner described and suggested hereinafter.

The proxy 920 is configured to receive data on one TCP connection, send the received data out on the other TCP connection, and effect the same function in the other direction. In the example of FIG. 9, the proxy 920 is comprised of a first protocol core 912 and a second protocol core 916 (collectively represented by protocol core 858 of FIG. 8), each of which executes embedded software designed to implement the full TCP protocol stack 890. The first protocol core 912 forms a first TCP connection 960 with the client 904, while the second protocol core 916 establishes a second TCP connection 964 with the server 908.

Although the following discussion referencing FIGS. 8 and 9 is carried out in the context of the TCP protocol, those skilled in the art will appreciate that the architecture of the present invention is applicable to other connection-oriented network protocols in which data delivery may be reliably confirmed. In the specific case of TCP, delivery is ensured by numbering outgoing segments sequentially and requiring the destination TCP peer to acknowledge arrival of the segments by number. If segments arrive out of order, they can be reordered via sequence numbers. If a segment fails to arrive, the destination TCP peer will not acknowledge its receipt, and the sending TCP peer will retransmit the data.

Failover for Proxied TCP Connections

In order to enable failover of the proxy 920, the present invention exploits the characteristic of the TCP protocol that if transmission of data across a TCP connection is not acknowledged via an ACK signal ("ACK"), then the sender is required to retain a copy of the transmitted data until such an ACK is received. In accordance with the invention, such an ACK is permitted to be sent only after the transmitted data has been "committed" to the receiving destination. For example, if data is received by the proxy 920 on the TCP connection 950, an ACK is not sent to the client 904 until it is ascertained that a predefined operation involving the data has been performed. As an example, such a predefined operation may comprise committing the data to an application executing upon the proxy 920 and receiving a command from such application to send an ACK to the client 904. The executing application may be configured to issue such a command on the basis of various criteria, such as determining that the data has been copied to a standby proxy 940. The predefined operation may also comprise receiving confirmation from the server 908 that it has received the data subsequent to transmission by the proxy 920. In this case an ACK would not be transmitted to the client 904 until the first protocol core 912 receives a commit message or the like from the second protocol core 916, which only sends such a message upon receiving an ACK from the server 908.

In the event of failure of the proxy 920, or of failure of the SPPS 800 in which it is incorporated, the standby proxy 940 is activated to the last state of the proxy 920 to which the standby proxy has been synchronized. In order to ensure that data is not lost during failover of the proxy 920 to the standby proxy 940, in one embodiment ACKs are not sent in response to data received at the proxy 920 over a TCP connection 960, 964 until (1) the data received over the TCP connection has been committed within the TCP peer served by the other TCP connection supported by the proxy 920; and (2) state information concerning one or both of the TCP connection(s) 960, 964 has been transferred to the standby proxy 940. In this way the client 904 is precluded from receiving an ACK until the server 908 has received the corresponding data, and vice-versa. Accordingly, any data in-transit through the proxy 920 or elsewhere within the SPPS 800 at the time of failover may be re-transmitted by the client 904 or the server 908, as applicable, which frees the proxy 920 from needing to store any data associated with the TCP connections 960, 964. It should be understood that the present invention is not limited to this particular criteria for determining when to acknowledge receipt of data received from a TCP peer, and other criteria of the type described below are also within the scope of the present invention.

Any of a number of mechanisms may be used to transfer the state of the TCP connections serviced by the proxy 920 during synchronization with the standby proxy 940. For example, a TCP connection established between the proxy 920 and the standby proxy 940 could be used to transport this state information. In the exemplary embodiment, this state information may be maintained within the flow state table administered by the LUC within the I/O processing unit 860. This information could be stored within the LUC in as many as three separate blocks of information; namely, one for each of the two TCP connections 960, 964 serviced by the proxy 820, and another for any control routine or other application executed by the proxy 920. It will typically be the case that the proxy 920 will regularly transfer state information to the standby proxy 940. In certain embodiments the proxy 920 may be configured to transfer state information only after the TCP connections to both the client 904 and server 908 have been established and data is actively being transferred. However, in other implementations transfer of such state information could occur earlier, such as during the establishment of TCP connections involving the proxy 920. After each transfer of state information is confirmed, the proxy 920 and the standby proxy 940 are synchronized.

In specific embodiments the proxy 920 may be configured to send an ACK associated with data transferred to the standby proxy 940 during synchronization prior to receiving confirmation from the standby proxy 940 that such data has been successfully transferred. This may improve performance by avoiding the delays associated with waiting for such confirmation prior to continuing processing activities within the proxy 920. During the initial synchronization process following establishment of a proxy, a large amount of state information may be transferred. Then, at various subsequent points of synchronization, smaller amounts of state information may be transferred (e.g., only the changes to the previously-synchronized state).

In the event of failure of the proxy 920, the standby proxy 940 can begin servicing the TCP connections with the client 904 and server 908 from the last successful point of synchronization. Detection of such failure of the proxy 920 may be performed in a number of different ways. However, each of the various detection schemes may be characterized as either an "automatic discovery" or an "external discovery" scheme. In this sense the term "automatic discovery" refers to the case in which the standby proxy 940 discovers that the proxy 920 has failed by determining that the connection used for transporting state information during synchronization operations has failed. For example, in cases in which a dedicated TCP connection is used to transport the state information, the standby proxy 940 may detect such failure of the proxy 920 upon failing to receive a "heartbeat" packet within the applicable time-out period. In this case the standby proxy 940 assumes that some type of system failure has occurred, and takes control of the TCP connections established by the proxy 920.

Figure 10:
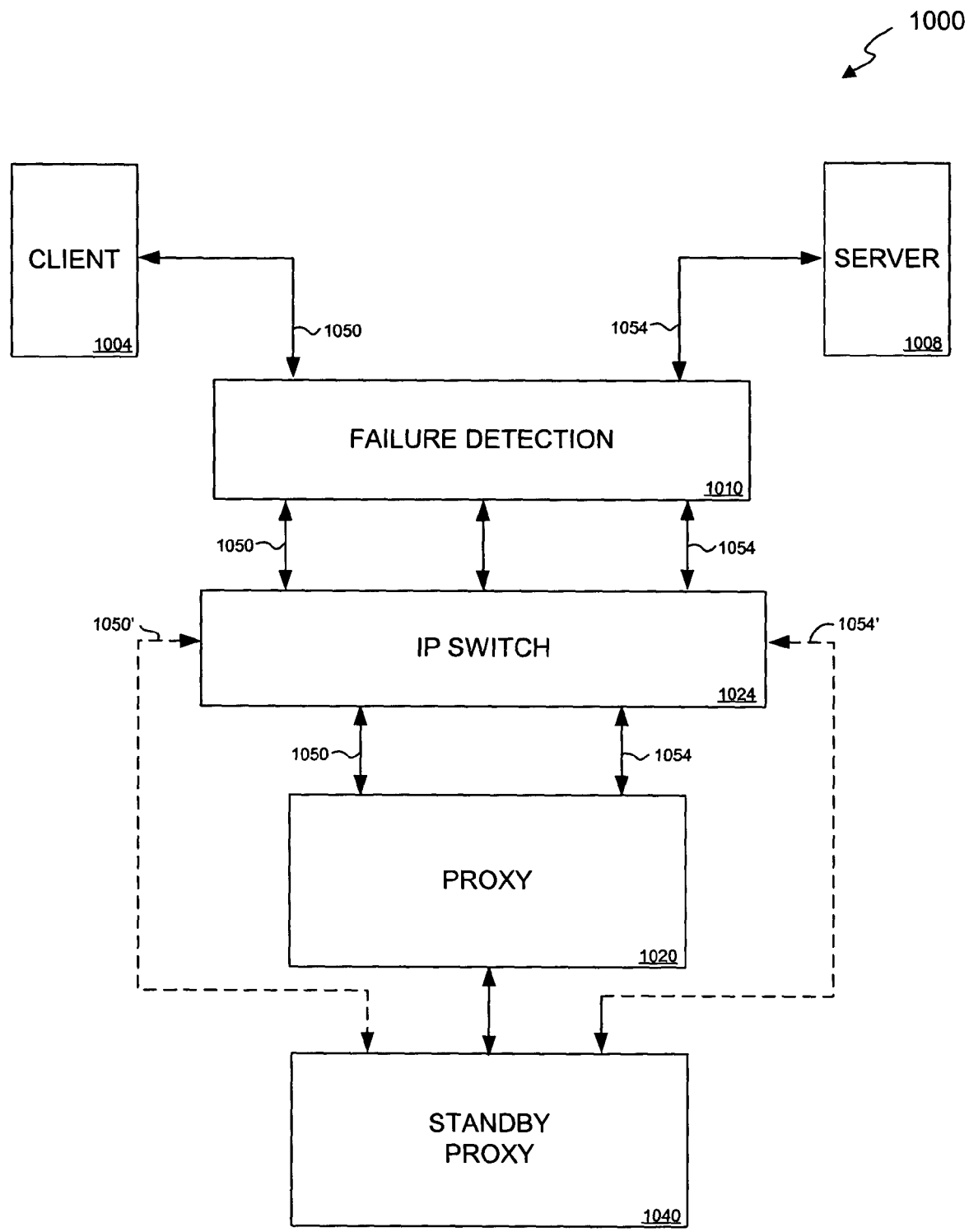
FIG. 10 is a block diagram of an SPPS which illustrates an approach to external detection and remediation of proxy failure.

FIG. 10 is a block diagram of an SPPS 1000 which illustrates an approach to external detection and remediation of proxy failure. In the case of external discovery in accordance with FIG. 10, an external failure detection entity 1010 is configured to detect failure of the proxy 1020. Upon detecting such failure, the external entity notifies a standby proxy 1040. The external failure detection entity 1010 may also command an IP switch 1024 or the like to redirect IP packets destined for the proxy 1020 to the standby proxy 1040. Such an IP switch 1024 may be configured to operate during either the external or automatic failure discovery modes. The external failure detection entity 1010 and IP switch 1024 may be realized as an integrated unit, which would itself be capable of both detecting failure of the proxy 1020 and "re-routing" packets to the standby proxy 1040.

If data is in-transit upon failover to the standby proxy 1040, any such data for which an ACK has not been sent will automatically be retransmitted by either the client 1004 or server 1008, as applicable. Any such transmitted data for which an ACK has not been sent may be in a number of states upon failover of the proxy 1020 to the standby proxy 1040. An exemplary list of a temporally-ordered subset of such states is set forth below, it being understood that other states may attach to such transmitted and unacknowledged data:

(1) data not yet sent by the applicable sourcing TCP peer within the client 1004 or server 1008;
(2) data received within the applicable SPPS (e.g., SPPS 800), but not yet within the proxy 1020;
(3) data received by the proxy 1020, but not yet sent to the destination TCP peer within the client 1004 or server 1008;
(4) data sent by the proxy 1020 to the destination TCP peer, but not yet received by such destination peer;
(5) data received by the destination TCP peer, and ACK sent by such peer;
(6) destination TCP connection has not yet received the ACK sent by the destination TCP peer;
(7) destination TCP connection has received the ACK, but proxy 1020 has not yet received the ACK;
(8) proxy 1020 has received the ACK, but has not sent a corresponding ACK on the source TCP connection;
(9) synchronization of state information from proxy 1020 to standby proxy 1040 is in progress;

(10) synchronization of state information from proxy 1020 to standby proxy 1040 completed;

(11) ACK has been sent by the proxy 1020 to the source TCP connection.

Upon detecting failure of the proxy 1020, the standby proxy 1040 assumes responsibility of administering the existing TCP connections based upon the state recorded during the last synchronization with the proxy 1020 (i.e., state (10) above). Any data transmitted to the standby proxy 1040 prior to this failover will be retransmitted by the peer on the source TCP connection, since such transmitted data will not yet have been acknowledged ("ACKed). As may be apparent, this approach is advantageous in that the proxy 1020, state transfer subsystem, and standby proxy 1040 need not store or otherwise be concerned with data "in-transit" at the time of the failover. Neither does any data buffered within the proxy 1020 need to be transferred to the standby proxy 1040 in connection with the failover thereto. In short, the present invention ensures that at the time of failover all data has been either unacknowledged or already "committed" to the standby proxy 1040.

Prior to tear-down of a proxy connection, synchronization of the standby proxy 1040 with the proxy 1020 should occur substantially in the manner described above. This is because if either TCP connection associated with the proxy 1020 is torn down, the other connection should not be left active by the standby proxy 1040 should a failure occur in the proxy 1020 (causing failover to the standby proxy 1040). Accordingly, during the synchronization process preceding tear-down of a TCP connection serviced by the proxy 1020, state transfer to the standby proxy 1040 should be acknowledged before initiating such tear-down.

Failover for Arbitrary TCP Connections

Except as otherwise provided below, failover of arbitrary TCP connections may be effected in a substantially similar fashion to that described previously with respect to proxied connections. In particular, failover of arbitrary TCP connections differs from failover of proxied connections in the following respects:

1) In the proxied case, the proxy 1020 synchronizes with the standby proxy 1040 upon affirmatively "consuming" the applicable data and prior to sending an ACK. In the case of an arbitrary TCP connection, some entity other than the proxy 1020 (e.g., an application or host computer system) consumes the applicable data, which enables transmission of the associated ACK.

2) Synchronization will generally be achieved, potentially less efficiently, by transferring every packet transmitted or received by the proxy 1020 and all associated state information to the standby system. This may be necessary to the extent no practical way exists of determining when data has been consumed as described above. In the absence of such knowledge regarding data consumption, an ACK may be safely sent only when all data associated with the ACK has been transferred to the standby system and synchronization has been completed.

The present invention is applicable to systems utilizing either "hot-standby" or "cold-standby" units. A hot-standby unit is operative to manage currently active (i.e., "live") connections, as well as to serve as a standby for a separate primary system. System configurations in which a plurality of hot-standby systems are employed tend to offer performance advantages by enabling implementation of load-balancing techniques.

Selective Failover Enablement

In accordance with the invention, both proxied and other TCP connections may be selectively enabled for failover protection. The trigger for activation of failover protection may be based upon on many different criteria such as, for example, IP address, IP type-of-service, TCP port number or content URL. In addition, failover may be automatically enabled once a given connection has existed for longer than a predefined period of time. One rationale for enabling failover for long-lived connections is that such connections may be associated with bulk transfers of information, the loss of which may engender greater user frustration than failures arising during shorter connections (e.g., such as the transaction-oriented connections common within the environment of the World Wide Web). The decision of whether or not to enable failover of a given connection may be made by an entity external to the proxy 1020 or SPPS 800, or internally through observation of connection set-up parameters.

C. Failover Within an HTTP Proxy Application

Figure 11:
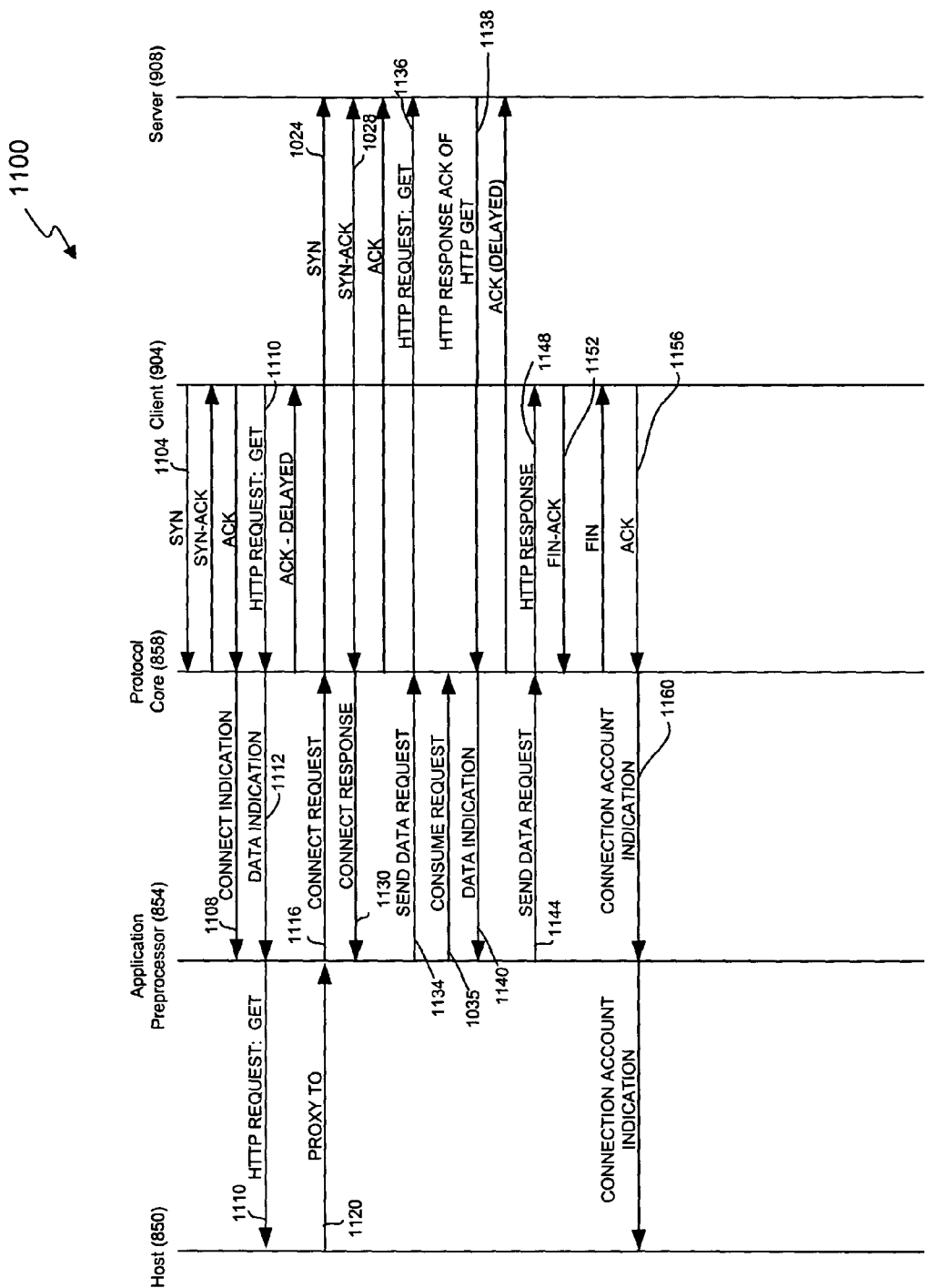
FIG. 11 is an event trace diagram representative of execution of an exemplary HTTP proxy application within the SPPS of FIG. 8.

FIG. 11 is an event trace diagram 1000 representative of execution of an exemplary HTTP proxy application within the SPPS 800 of FIG. 8. The diagram 1000 is intended to provide background contextual information relevant to various failover operations and command syntax described below. As is described more fully below with reference to FIG. 11, the SPPS 800 is configured to perform all of the functions necessary to effectively process an HTTP proxy, with the exception of actually deciding to which external entity the applicable connection is to be proxied. In particular, when executing an HTTP proxy application the SPPS 800 initially waits for an incoming connection. The incoming HTTP GET is then forwarded to the host 850 via I/O processing unit 860, which permits the host 850 to identify the external server (e.g., server 1008) to which the connection is to be proxied. The SPPS 800 then initiates the connection to the specified server, and proxies data between the server-side connection and the client-side connection until one side closes. At this point the SPPS 800 closes both TCP connections and sends a connection statistics message to the host 850.

Turning now to FIG. 11, a connection request 1004 is seen to arrive at the protocol core 858 from client 1004. In response, a client connection is established and the protocol core 858 sends a Connect Indication to the application preprocessor 854, which in turn initializes its per-connection state in a flow descriptor table (not shown).

The client 1004 then issues an HTTP GET Request 1010. Although the GET may arrive in more than a single TCP packet, in the example of FIG. 11 is assumed that the GET fits into a single packet. It is also assumed that an Input Notification Method (described below) is in Always Forward mode (described below) which results in incoming data (as long as it is in order) being sent on to the application preprocessor 854. As indicated by FIG. 11, the GET is received by the protocol core 858, which forwards it to the application preprocessor 854 via a Data Indication 1012. In the exemplary implementation the GET is forwarded directly from scratch-pad memory 720 before moving the data to socket memory within the I/O processing unit 860. Assuming the connection to be in the Always Forward mode with Consume Required (described below), the protocol core 858 moves the data to the socket memory receive buffer of the client TCP connection while it "waits" for a Consume Request event.

As shown in FIG. 11, the application preprocessor 854 receives the Data Indication. Based on the initial application connection state found in the flow descriptor table, the application preprocessor 854 forwards the data along to the host 850 via I/O processing unit 860. In this case the Input Notification Method is still Always Forward, but the Consume Required sub-mode is enabled. Thus, the application preprocessor 854 can forward the data to the host 850, but leave it in socket memory for the client connection. The Consume Request 1116 is postponed until after the data from the client 1004 has been delivered to the server 1008.

The host 850 then receives the GET 1110, parses the various header fields and makes a "proxy decision" as to the identify of the server best fit to fulfill the GET. In the present example, it is assumed that all of the information needed to make a proxy decision is contained in the data forwarded by the application preprocessor 854. The host then sends a Proxy-to message 1120 to the application preprocessor 854 which contains the destination IP address of the selected server and routing information for the server TCP connection. This message is received by the application preprocessor 854 which, upon examining the applicable entry in the flow descriptor table, realizes that the server TCP connection has not yet been established. Accordingly, it initiates the server TCP connection by sending a Connect Request 1116 and records the application state in the flow descriptor table as connecting. The application preprocessor 854 also records information about the client connection in order to enable the client-side flow descriptor to be retrieved at a later time. In the exemplary embodiment the server connection is configured with similar parameters as the listen entry for the client connections, except that a Consume Required submode of Always Forward mode is disabled.

The protocol core 858 receives the Connect Request 1116 and proceeds to establish a connection to the server 858 (by sending a SYN 1124). When the SYN-ACK 1128 is received from the server 808, the protocol core 858 sends a Connect Response 1130 to the application preprocessor 854. Upon receiving the Connect Response, the application preprocessor 854 discerns from the applicable application state that data from the connection to the client 804 is buffered within the associated socket memory receive buffer and awaiting forwarding to the server. The application preprocessor 854 then retrieves the client data and causes it to be placed in scratchpad memory 720, and notifies the client TCP connection that the data has been "consumed". Once the data has been transferred from socket memory to the scratchpad memory 720, the application preprocessor 854 may then command 1134 the protocol core 858 to transmit it on the server TCP connection. The application preprocessor 854 then records information about the server TCP connection in an "application area" of the entry in the flow descriptor table associated with client TCP connection. At this point the application preprocessor 854 possesses sufficient information to forward data received by the proxy 820 from the client 804 to the server 808, and vice-versa.

The application preprocessor 854 notifies 1135 the protocol core 858 that it has consumed data from the client TCP connection. The protocol core 858 uses this information to open the TCP receive window it advertises to the client and to free the buffered data (HTTP GET 1136) in the socket memory receive buffer associated with the client TCP connection. The server 808 then issues an HTTP response 1138 with accompanying data. The protocol core 858 receives the HTTP response 1138, and immediately forwards it via a Data Indication 1140 to the application preprocessor 854. When the application preprocessor 854 receives the Data Indication 1140, it also receives application state information that informs it of the proxy parameters. The data remains in the on-chip scratchpad memory 720, while the application preprocessor 854 forwards it on the client connection with a Send Data Request 1144.

As is indicated by FIG. 11, the protocol core 858 forwards the proxy data (HTTP response 1148) to the client 804, sourcing the data from the scratchpad memory 720. The client 804 then determines that its GET has been satisfied and closes 1152 the TCP connection. When the TCP connection is fully closed 1156, the protocol core 854 sends a Connection Account Indication 1160 containing various statistics concerning the connection. The application preprocessor 854 could optionally accumulate statistics without forwarding the per connection accounting information to the host 850.

Consistent with the invention, a number of events may be defined to facilitate failover of a proxy operative in the manner described above with reference to FIG. 11 Certain of these events are described below.

Consume Required

This sub-parameter controls the extent to which the application preprocessor 854 may process forwarded data without "consuming" it. In this sense "consuming" means to remove the forwarded data from the TCP receive buffer and possibly advertise an opened window to the TCP peer. If Consume Required is disabled, TCP 890 sends Receive Data Indications and assumes that the application consumes the data as it is delivered. TCP 890 can then free the associated storage in the receive buffer and advertise a new window. However, if Consume Required is enabled, TCP 890 sends Receive Data Indications, but does not free the associated receive buffer or advertise a new window. Accordingly, the application 880 executing on the preprocessor 854 informs TCP 890 that it has consumed data using a Consume Data Request. Furthermore, the application preprocessor 854 directs the SMC within the I/O processing unit 860 to buffer the data (move it from scratchpad to socket memory) in the event the preprocessor 854 determines to leave the data in the per-connection receive buffer and postpone the Consume Data Request. Later, perhaps upon receiving a subsequent chunk of data or upon some other event, the application preprocessor 854 moves the data out of socket memory, consumes it (or forwards it to the host), and notifies TCP 890 with a Consume Data Request. As discussed above, one aspect of the inventive failover technique contemplates the selective withholding of ACKs until an indication or other confirmation has been provided that the relevant data has been consumed.

Consume Data Request

The application 880 may use this event to notify TCP 890 that it has consumed a chunk of in-order bytes from the receive buffer. The Consume Data Request event induces a type of Pull mode by which TCP 890 notifies the application 880 of available bytes (with the Data Available Indication). The application 880 may then "pull" the specified bytes out of socket memory without involving the protocol core 858. After the application 880 has consumed the data, it uses this event to notify the protocol core 858 that it may free the associated socket data memory and advertise a new TCP receive window to the TCP peer. The application preprocessor 854 issues this event, since both direct access to the receive socket buffer of TCP 890 as well as to the scratchpad are required and an application executing externally to the SPPS 800 does not have such access.

Withhold Data ACK

The Withhold Data ACK primitive allows TCP 890 to withhold acknowledging data until the application 880 deems it appropriate or desirable to do so. This may facilitate the semantics involved in establishing a proxying session, and enable data to be temporarily "stored" (i.e., as a result of not being transmitted) within the external TCP peer while the data is being copied to an active standby proxy for failover operations in accordance with the invention. If the Withhold Data ACK is disabled, TCP 890 sends ACKs for data according to conventional ACK policy and standardized protocols. If this primitive is enabled, the application 880 can later allow ACKs with the Withhold Data ACK primitive and the value Disabled.

Withhold Data ACK Request

The Withhold Data ACK Request directs TCP 890 to enter a "Withhold ACK mode," in which TCP 890 withholds ACKs for data even while data may be received in order. The Withhold ACK mode is also set by a per-service configuration parameter, so that when an incoming connection arrives data will not be acknowledged until the application 880 has permitted it. If the Withhold ACK mode disabled, TCP 890 sends ACKs for data according to conventional ACK policy and standardized protocols. TCP 890 sends a Withhold Data ACK Response to confirm that it is in withhold ACK mode.

When data is received in Withhold ACK mode, it can be buffered in socket memory or forwarded to the application 880 in accordance with the Input Notification Method. This event can be concatenated with Input Notifcation Method request and Application Preprocessor Intercept Method request to synchronize related mode changes. This primitive serves to facilitate the failover techniques of the present invention by providing the application 880 explicit control over whether or not to ACK data, thereby enabling the application 880 to communicate a flow control condition to a proxied TCP connection. It is nonetheless observed that in certain embodiment withholding ACKs on the "server" side of a proxy connection may be inadvisable, since it may cause servers to buffer data that otherwise would not be buffered. In the event that ACK timing is jittery, a server-side TCP peer may inappropriately react to ACK jitter by backing off its transmissions as a result of misinterpreting ACK jitter as congestion.

It is noted that once TCP data is acknowledged, there is no way to request the TCP peer to retransmit that data. Conversely, until TCP acknowledges the data, it is reliably stored in the send buffer of the TCP peer. The present invention leverages this characteristic of the send buffers of TCP peers in connection with providing reliable failover capabilities.

The application 880 should generally invoke the Withhold ACK mode with caution, since withholding ACKs changes the TCP peer's interpretation of round trip time. If ACKs are withheld too long, the peer's retransmit timer will expire causing unnecessary retransmissions and "congestion backoff." But if the application 880 is consistently responsive with ACK Prompt Confirmations, no additional jitter is added to ACKs and the TCP congestion management algorithms may stabilize without leading to such a misinterpretation of round trip time.

ACK Prompt Indication

TCP 890 sends the ACK Prompt Indication event only in a Prompt-for-ACK sub-mode of Withhold ACK mode. It notifies the application 880 that TCP 890 has determined, via standard ACK policy, that it desires to acknowledge certain data sent by the peer. In the Prompt-for-ACK sub-mode, TCP 890 does not acknowledge data without the approval of the application 880. Accordingly, the application 880 must reply with an ACK Prompt Confirmation when it is ready for TCP to acknowledge all or part of the data.

It is observed that if the application 880 permits TCP 890 to acknowledge only part of the data, the application 880 should "remember" to acknowledge the remainder at a later time. However, even if the application 880 does not so remember, TCP 890 will eventually issue another ACK prompt indication.

ACK Prompt Confirmation

The application 880 sends an ACK Prompt Confirmation event following receipt of an ACK Prompt Indication(s) in order to permit TCP 890 to acknowledge data sent from the peer. It is valid only in the Prompt-for-ACK sub-mode of Withhold ACK mode. A single ACK Prompt Confirmation can retire multiple ACK Prompt Indications if the TCP Receive Sequence Number parameter subsumes the TCP sequence numbers in all the ACK Prompt Indications. In other words, each ACK Prompt Indication event does not require an individual ACK Prompt Confirmation event.

A number of embodiments of the present invention have been described. Nevertheless, it will be understood that various modifications may be made without departing from the scope of the invention. For example, the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order. Moreover, the numerical values for the operational and implementation parameters set forth herein (e.g., bus widths, DDR burst size, number of PPCs, amount of memory) are merely exemplary, and other embodiments and implementations may differ without departing from the scope of the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method of facilitating failover of a stateful protocol connection from a proxy element to a standby proxy, the method comprising:
   receiving, at the proxy element, data sent by a first external entity in accordance with a first stateful protocol connection;
   withholding acknowledgment of receipt of the data at the proxy element until a predefined operation involving the data has been performed, said predefined operation comprising:
   sending, from the proxy element, the data to a second external entity; and
   receiving, at the proxy element, a second acknowledgment that the data has been received at the second external entity;
   establishing a state information connection between the proxy element and the standby proxy;
   transferring, via the state information connection, state information relating to the first stateful protocol connection from the proxy element to a standby proxy; and
   sending, from the proxy element, the acknowledgment of receipt to the first external entity subsequent to performance of the predefined operation involving the data.

2. The method of claim 1 wherein the sending of the data to the second external entity is performed in accordance with a second stateful protocol connection, the method further including transferring state information relating to the second stateful protocol connection to the standby proxy.

3. The method of claim 2 further including failing over the second stateful protocol connection to the standby proxy.

4. The method of claim 1 further including failing over the first stateful protocol connection to the standby proxy.

5. The method of claim 4 further including beginning servicing, at the standby proxy, the first stateful protocol connection from a last successful point of synchronization between the proxy element and the standby proxy.

6. The method of claim 4 wherein said failing over the first stateful protocol connection to the standby proxy is initiated based on an automatic discovery scheme.

7. The method of claim 6 wherein the automatic discovery scheme comprises determining failure of a heartbeat packet within a defined timeout period.

8. The method of claim 4 wherein said failing over the first stateful protocol connection to the standby proxy is initiated based on an external discovery scheme.

9. The method of claim 8 wherein the external discovery scheme comprises detecting failure of the proxy by an external failure detection entity.

10. The method of claim 9 wherein the external detection entity commands a switch to redirect packets destined for the proxy element to the standby proxy.

11. The method of claim 1 further including:
transmitting, from the first external entity, the data to the proxy element and retaining a copy of the data; and
deleting the copy of the data upon receipt at the first external entity of the acknowledgment.

12. The method of claim 1 wherein the transferring of the state information is performed in accordance with an additional stateful protocol connection.

13. The method of claim 1 further including detecting, at the standby proxy, failure of the first stateful protocol connection and initiating failover of the first stateful protocol connection from the proxy element to the standby proxy.

14. The method of claim 1 wherein the state information connection between the proxy element and the standby proxy is a second stateful protocol connection.

15. The method of claim 14 wherein the second stateful protocol connection is a TCP connection.

16. The method of claim 1 wherein the state information is transferred from a first memory associated with the proxy element to a second memory associated with the standby proxy.

17. The method of claim 1 wherein the state information is transferred only after a stateful protocol connection has been established between the proxy element, an external client and an external server, and data has been transferred between the external client and the external server.

18. The method of claim 1 wherein the state information is transferred during establishment of a stateful protocol connection between the proxy element, an external client and an external server.

19. The method of claim 1 wherein the proxy element sends the acknowledgment of receipt to the first external entity prior to receiving a confirmation from the standby proxy that the state information has been transferred.

20. The method of claim 1 wherein all of the state information is transferred during an initial synchronization operation between the proxy element and the standby proxy.

21. The method of claim 20 wherein only changes to the state information transmitted during the initial synchronization operation are transferred during a subsequent synchronization operation.

22. The method of claim 1 wherein the state information is transferred during a first synchronization operation between the proxy element and the standby proxy, and wherein only changes to the state information are transmitted during a second, subsequent synchronization operation between the proxy element and the standby proxy.

23. A method of facilitating failover of a stateful protocol connection, the method comprising:
receiving, at a primary system, data sent by a first external entity in accordance with the stateful protocol connection;
withholding acknowledgment of receipt of the data until a predefined operation involving the data has been performed, said predefined operation comprising:
sending the data to a host entity; and
receiving confirmation that the data has been received at the host entity;
establishing a state information connection between the primary system and a standby system;
transferring, via the state information connection, state information relating to the stateful protocol connection to the standby system; and
sending, from the primary system, the acknowledgment of receipt to the first external entity subsequent to performance of the predefined operation involving the data, said predefined operation being performed subsequent to the receipt of the data and being other than determining the data has been satisfactorily received.

24. The method of claim 23 further including failing over the stateful protocol connection to the standby system.

25. The method of claim 24 further including beginning servicing, at the standby system, the stateful protocol connection from a last successful point of synchronization between the proxy element and the standby system.

26. The method of claim 23 wherein the transferring of the state information is performed in accordance with an additional stateful protocol connection.

27. The method of claim 23 further including detecting, at the standby system, failure of the stateful protocol connection and initiating failover of the stateful protocol connection to the standby system.

28. A stateful protocol processing apparatus comprising:
a proxy element having a first protocol core and a second protocol core, the first protocol core supporting a first stateful protocol connection over which data is received from a first external entity and the second protocol core supporting a second stateful protocol connection to a second external entity over which the data is transmitted, wherein the proxy element is configured to withhold acknowledgment of receipt of the data until a predefined operation involving the data has been performed and to send the acknowledgment of receipt to the first external entity subsequent to performance of the predefined operation, said predefined operation comprising receiving, at the proxy element a second acknowledgment that the data has been received at the second external entity; and
a standby element having a state information connection to the proxy element to which state information relating to the first stateful protocol connection is transferred from the proxy element to the standby element via the state information connection.

29. The apparatus of claim 28 further including a switch disposed to failover the first stateful protocol connection from the proxy element to the standby element.

30. The apparatus of claim 29 further including a failure detection unit configured to detect failure of the first stateful protocol connection and to command the switch to initiate said failover, the standby element beginning servicing of the first stateful protocol connection from a last successful point of synchronization between the proxy element and the standby element.

31. The apparatus of claim 28 wherein the standby element includes memory in which is stored the state information relating to the first stateful protocol connection.

32. A method of facilitating failover of a stateful protocol connection, the method comprising:
   receiving data sent by a first external entity in accordance with the stateful protocol connection;
   establishing a state information connection to a standby system;
   transferring, via the state information connection, state information relating to the stateful protocol connection to the standby system;
   withholding acknowledgment of receipt of the data until a predefined operation involving the data has been performed said predefined operation comprising:
   sending the data to a host entity;
   receiving confirmation that the data has been received at the host entity; and
   storing the state information in memory within the standby system, wherein
   the predefined operation is performed subsequent to the receipt of the data; and
   sending the acknowledgment of receipt to the first external entity subsequent to performance of the predefined operation involving the data.

* * * * *